(12) United States Patent
Takemura

(10) Patent No.: US 8,296,909 B2
(45) Date of Patent: Oct. 30, 2012

(54) MOBILE POWER GENERATOR APPARATUS

(75) Inventor: Kazuhito Takemura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 230 days.

(21) Appl. No.: 12/479,037

(22) Filed: Jun. 5, 2009

(65) Prior Publication Data
US 2009/0313791 A1 Dec. 24, 2009

(30) Foreign Application Priority Data

Jun. 18, 2008 (JP) ................................. 2008-159056

(51) Int. Cl.
B25G 1/04 (2006.01)
(52) U.S. Cl. ......................................................... 16/429
(58) Field of Classification Search .................... 16/429, 16/436–437; 56/DIG. 18; 280/47.371, 655.1; 290/1 A, 1 R; 123/3
See application file for complete search history.

(56) References Cited

U.S. PATENT DOCUMENTS

| | | | | |
|---|---|---|---|---|
| 3,855,763 A | * | 12/1974 | Seifert et al. ................. | 56/320.2 |
| 5,261,215 A | * | 11/1993 | Hartz et al. .................... | 56/11.9 |
| 5,653,096 A | * | 8/1997 | Edwards ......................... | 56/16.7 |
| 6,220,240 B1 | * | 4/2001 | Grady et al. ................... | 126/519 |
| 7,131,166 B2 | * | 11/2006 | Cohen et al. ................... | 16/232 |
| 7,159,271 B2 | * | 1/2007 | Sepke et al. .................... | 15/320 |
| 7,496,990 B2 | * | 3/2009 | Qiao ............................... | 16/437 |

FOREIGN PATENT DOCUMENTS

JP 11-321658 A 11/1999

* cited by examiner

*Primary Examiner* — Victor Batson
*Assistant Examiner* — Matthew Sullivan
(74) *Attorney, Agent, or Firm* — Westerman, Hattori, Daniels & Adrian, LLP

(57) ABSTRACT

Mobile power generator apparatus includes: upper and lower pivoting links vertically pivotably connected at their one end portions to a frame; and a handle mounted to the frame for pulling the generator apparatus and connected at its proximal end portion to other end portions of the links. The handle is expandable, in a direction where a grip moves away from the links, in interlocked relation to upward pivotal movement of the links responsive to a pulling force, and is collapsable, in a direction where the grip moves toward the links, in interlocked relation to downward pivotal movement of the links responsive to a pushing force.

7 Claims, 23 Drawing Sheets

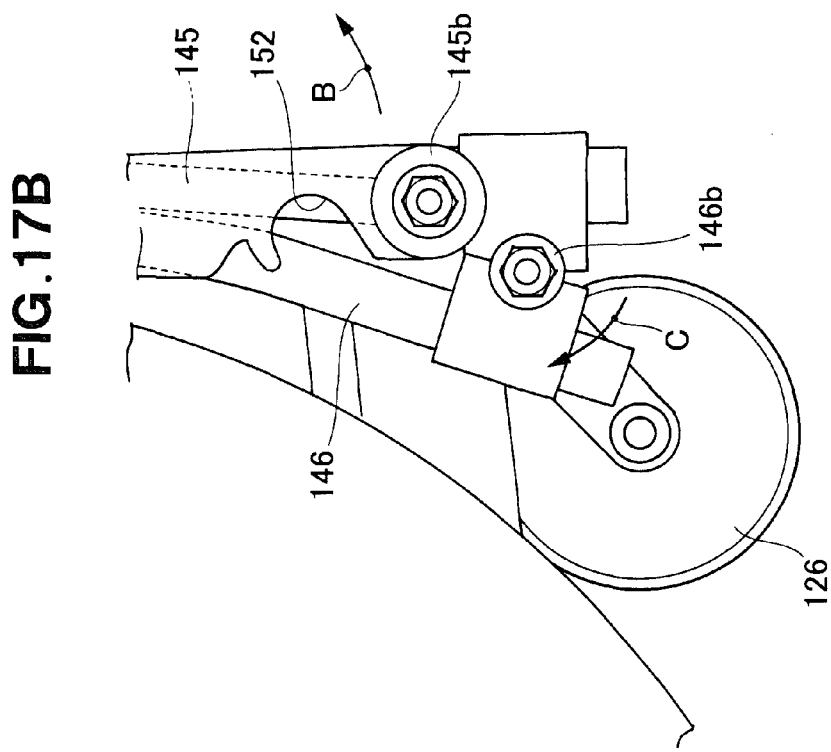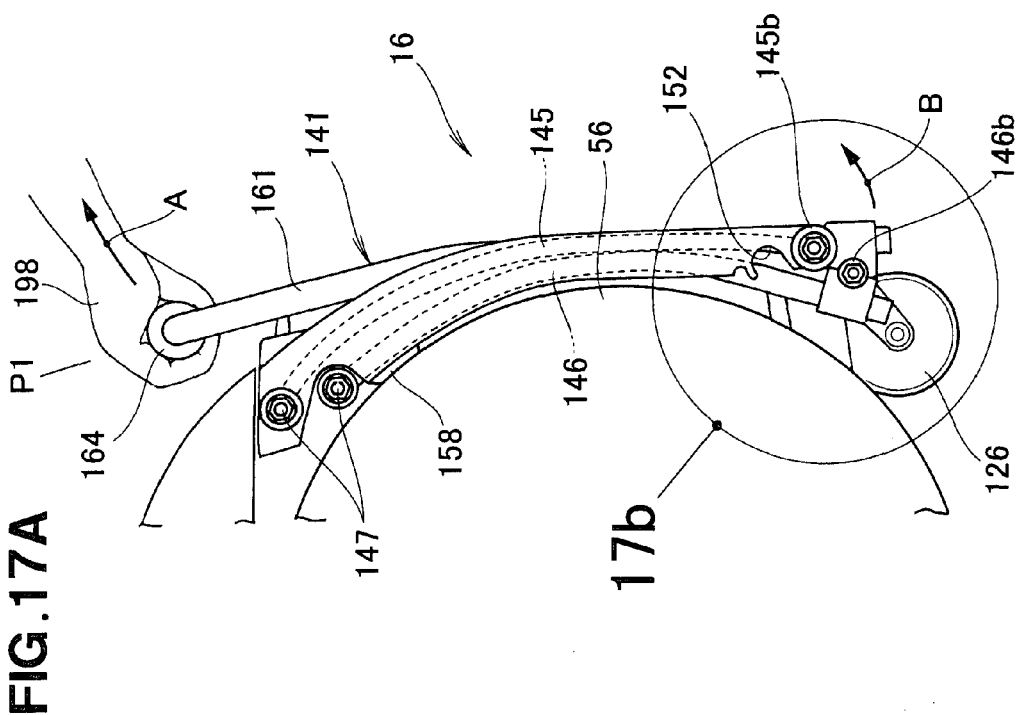

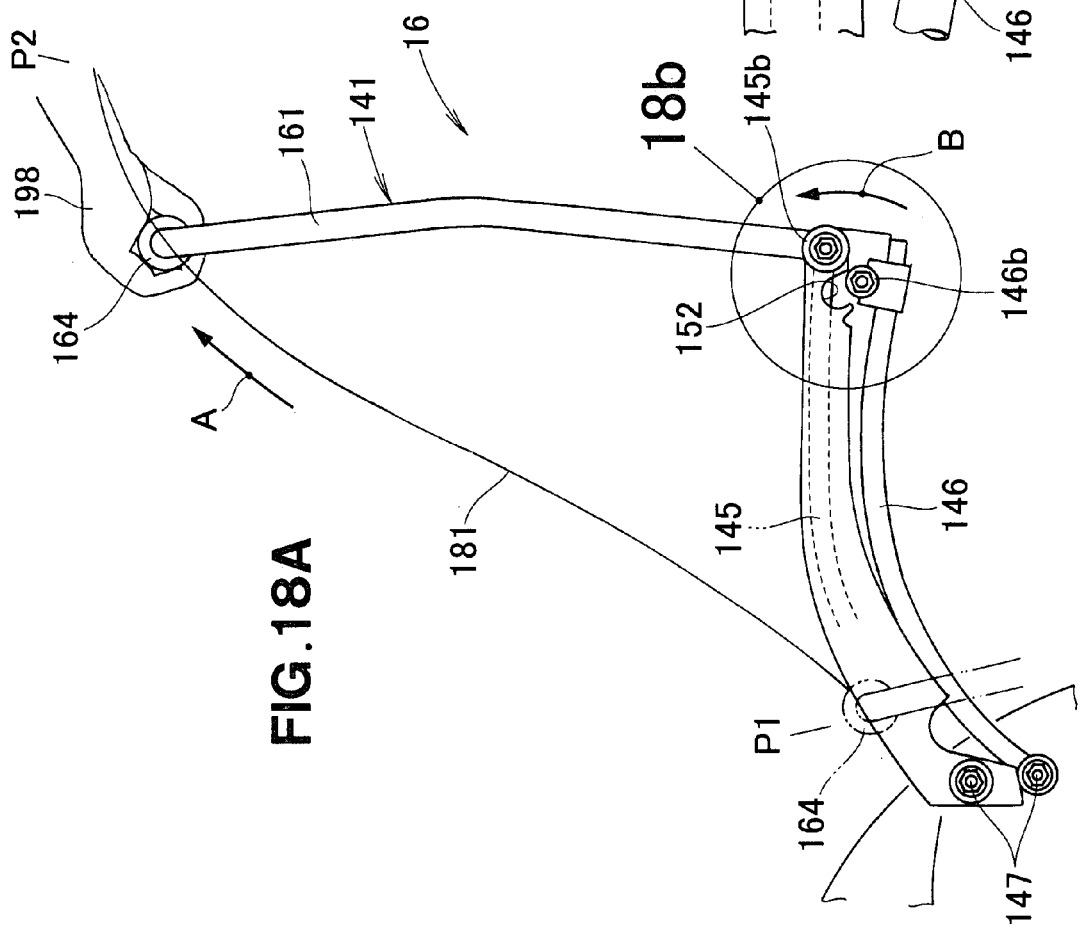

MOBILE POWER GENERATOR APPARATUS

FIELD OF THE INVENTION

The present invention relates to mobile power generator apparatus in which the power generator is mounted in a frame and a pulling handle for pulling and moving the power generator apparatus is mounted to the frame.

BACKGROUND OF THE INVENTION

Among the conventionally-known mobile power generator apparatus are ones in which the power generator (i.e., body of the mobile power generator apparatus) is mounted in a frame, and in which a pulling handle is pivotably connected at its proximal end portion to a front lower end portion of the frame via a pivot shaft. In these mobile power generator apparatus, the pulling handle can be accommodated in the frame by being pivoted upward about the pivot shaft and can be shifted to an operating position by being pivoted forward about the pivot shaft. One example of the mobile power generator apparatus of the aforementioned type is disclosed in Japanese Patent Application Laid-open Publication No. HEI-11-321658.

In the mobile power generator apparatus disclosed in the HEI-11-321658 publication, the pulling handle has a grip section on its distal end portion, and the grip section can be shifted to a pulling position by the pulling handle being pivoted forward about the pivot shaft. User or human operator can grip the grip section to lift the pulling handle and thereby move (pull) the mobile power generator apparatus.

In the mobile power generator apparatus disclosed in the HEI-11-321658 publication, the pulling handle can be accommodated or retracted in the frame by the human operator pivoting upward about the pivot shaft, as noted above. In order to reduce the overall height of the pulling handle retracted in the frame, the pulling handle has to be formed in generally the same length as the height of the pulling handle, and thus, it is difficult to form the pulling handle in a sufficient length. Consequently, it would be difficult to position the grip section at a suitable height, suiting or appropriate to the height of a human operator (especially, a human operator's hand), when the pulling handle is in the pulling position.

SUMMARY OF THE INVENTION

In view of the foregoing prior art problems, it is an object of the present invention to provide an improved mobile power generator apparatus which can position the grip section at a suitable height, appropriate to the height of a human operator, when the pulling handle is in the pulling position.

In order to accomplish the above-mentioned object, the present invention provides an improved mobile power generator apparatus, which comprises: a frame having a power generator mounted therein; upper and lower pivoting links disposed in vertically proximate relation to each other, the upper and lower pivoting links being vertically pivotably connected at their respective one end portions to the frame; and a pulling handle having a grip section provided on a distal end portion thereof, the pulling handle being pivotably mounted via the upper and lower pivoting links to the frame, the pulling handle being connected at a proximal end portion thereof to respective other end portions of the upper and lower pivoting links in such a manner 1) that the pulling handle is expandable, in a direction where the grip section moves away from the respective one end portions of the upper and lower pivoting links, by pivoting about the proximal end portion in interlocked relation to upward pivotal movement, about the one end portions, of the upper and lower pivoting links responsive to a pulling force applied to the pulling handle by a human operator, and 2) that the pulling handle is collapsable, in a direction where the grip section moves toward the respective one end portions of the upper and lower pivoting links, by pivoting about the proximal end portion in interlocked relation to downward pivotal movement, about the one end portions, of the upper and lower pivoting links responsive to a pushing force applied to the pulling handle by the human operator.

Because the pulling handle is expandable, in the direction where the grip section moves away from the upper and lower pivoting links, in interlocked relation to upward pivotal movement of the upper and lower pivoting links responsive to a pulling force applied to the pulling handle by the human operator, the grip section of the pulling handle can be raised to a relatively high position by the upward pivotal movement of the upper and lower pivoting links. Thus, the grip section of the pulling handle shifted to the expanded position can be located at a suitable height appropriate to the height of the human operator (especially, human operator's hand).

Preferably, the expanding and collapsing movement of the pulling handle is guidedly regulated by the upper and lower pivoting links so that the grip section moves in a fixed or predetermined trajectory during the expanding and collapsing movement. Thus, the human operator can readily collapse/expand the pulling handle by just moving his or her hand, gripping the grip section, along the predetermined trajectory. As a result, the operation to be performed by the human operator to collapse/expand the pulling handle can be facilitated, which can significantly enhance the usability of the power generator apparatus.

Preferably, the upper and lower pivoting links have first and second engaging elements, respectively, and as the pulling handle is expanded so that the grip section is shifted away from the respective one end portions of the upper and lower pivoting links to a pulling position for the human operator to pull and move the mobile power generator apparatus with the grip section, the first and second engaging elements of the upper and lower pivoting links engage with each other to thereby prevent the pulling handle from being expanded beyond the pulling position. Thus, the present invention can dispense with a separate stopper that was required in the prior art apparatus to prevent the pulling handle from being expanded beyond the pulling position, and consequently, the mobile power generator apparatus of the present invention can be simplified in construction.

Preferably, the mobile power generator apparatus of the invention further comprises a handle retaining mechanism including first and second engaging elements that engage with each other as the pulling handle is expanded, so as to prevent the pulling handle from unintentionally collapsing, due to weights of the pulling handle and the upper and lower pivoting links, when the pulling handle is in an expanded position with the grip section located in a pulling position for the human operator to pull and move the mobile power generator apparatus with the grip section.

BRIEF DESCRIPTION OF THE DRAWINGS

Certain preferred embodiments of the present invention will be described in detail below, by way of example only, with reference to the accompanying drawings, in which:

FIGS. 17A and 17B are views explanatory of an example manner in which the pulling unit is shifted to the expanded position;

FIGS. 18A and 18B are views showing the pulling unit having been expanded partway;

DETAILED DESCRIPTION OF THE PREFERRED EMBODIMENTS

Figure 1:
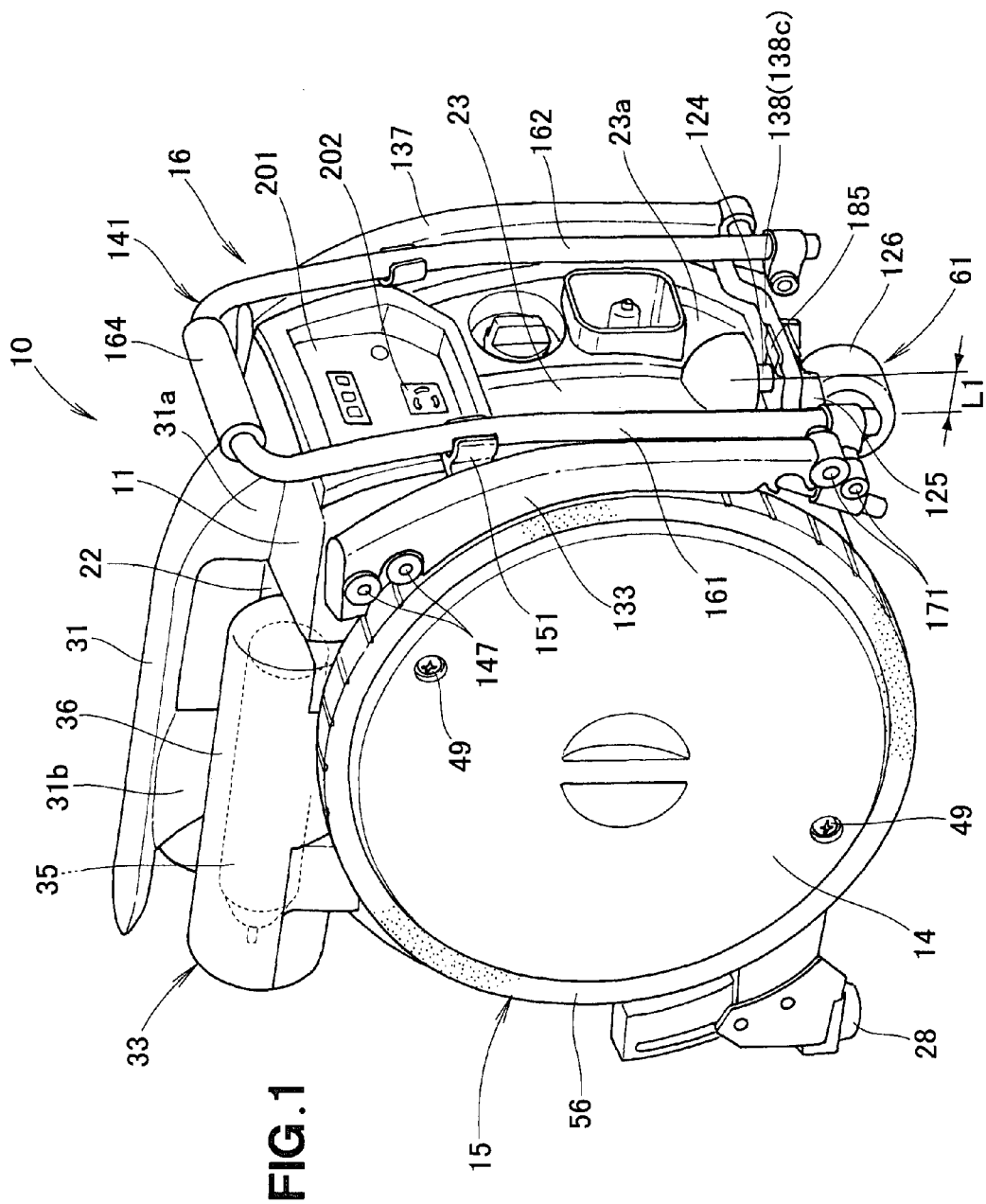
FIG. 1 is a perspective view showing a mobile power generator apparatus according to an embodiment of the present invention.
Figure 2:
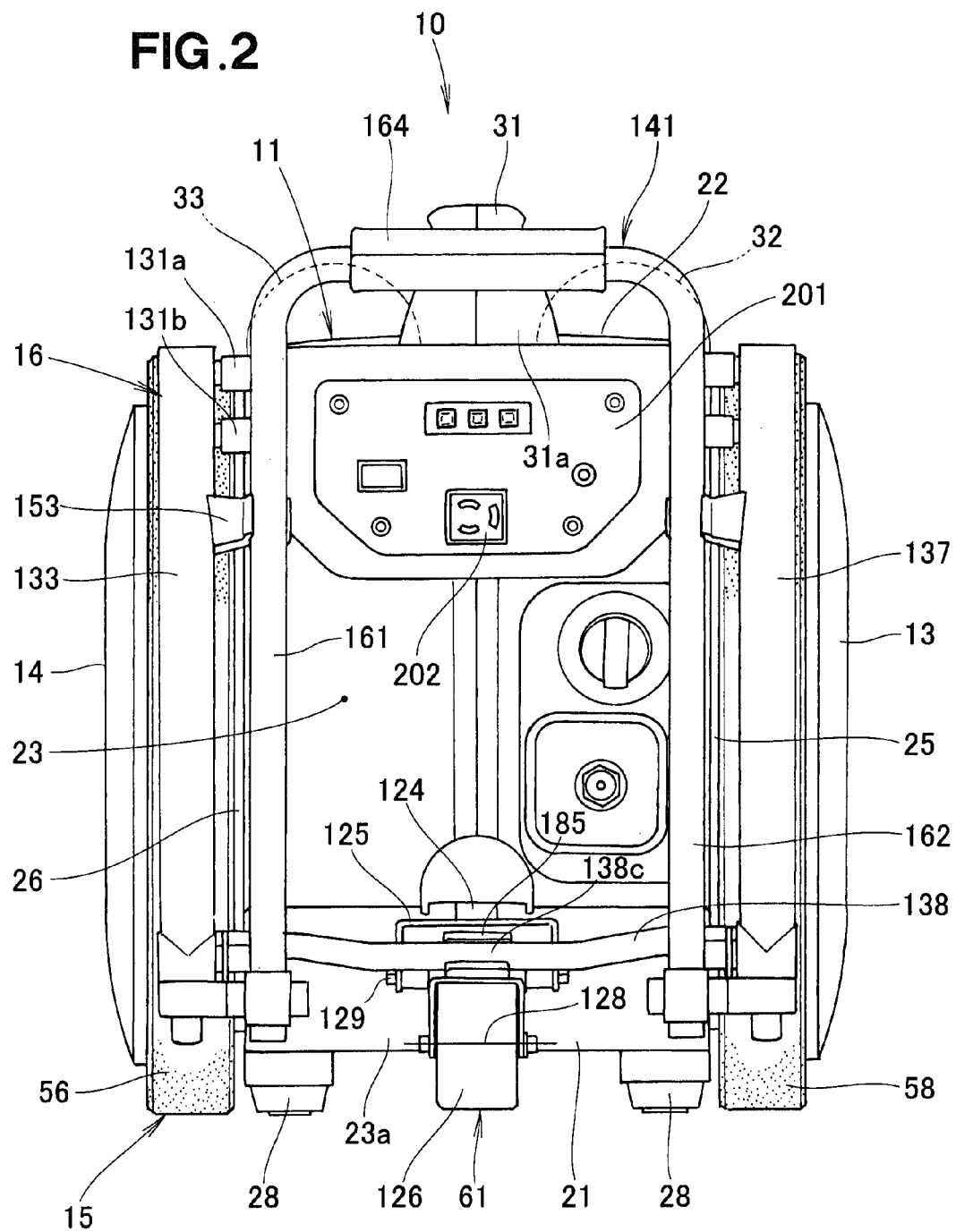
FIG. 2 is a front view of the mobile power generator apparatus of the present invention

Reference is now made to FIG. 1 showing in perspective a mobile power generator apparatus 10 according to an embodiment of the present invention, and to FIG. 2 showing in front elevation the mobile power generator apparatus 10. The mobile power generator apparatus 10 includes a frame 11 forming a framework of the power generator, an engine/power generator unit 12 (see also FIG. 4), a left side cover 13 provided on the left side of the frame 11, a right side cover 14 provided on the right side of the frame 11, a carriage unit 15 attached to the frame 11, and a pulling unit 16 provided on a front section 11a of the frame 11.

The frame 11 includes a bottom wall 21, an upper wall 22, a front wall 23, a rear wall 24 (see FIG. 4), a left side wall 24 and a right side wall 26, which together constitute a rectangular parallelepiped shape. Left and right leg portions 28 are vertically movably attached to a lower end portion 24a (see FIG. 4) of the rear wall 24.

The upper wall 22 has a fixed grip section 31 provided on a substantial middle in a width or left-right direction (i.e., substantial widthwise middle) region of the power generator apparatus 10, and left and right cassette accommodating portions 32 and 33 are provided to the left and right of the fixed grip section 31.

The fixed grip section 31 has front and rear ends 31a and 31b fixed to the upper wall 22. The mobile power generator apparatus 10 can be carried by a user or human operator gripping the fixed grip section 31 with a hand to thereby lift the grip section 31.

The left and right cassette accommodating portions 32 and 33 are each provided for accommodating therein a cassette gas canister 35 containing a gas fuel to be supplied to an engine 18 (see FIG. 4) of the engine/power generator unit 12. More specifically, the right cassette accommodating portion 33 is provided in a right half area of the upper wall 22 and has an openable/closable right cassette cover 36 attached thereto. The cassette gas canister 35 can be loaded into the right cassette accommodating portion 33 with the right cassette cover 36 opened, and it is accommodated in the right cassette accommodating portion 33 with the right cassette cover 36 kept in the closed position. The left cassette accommodating portion 32 is constructed and disposed in left-right symmetrical relation to the right cassette accommodating portion 33, and thus, a detailed description of the left cassette accommodating portion 32 is omitted here.

Figure 3:
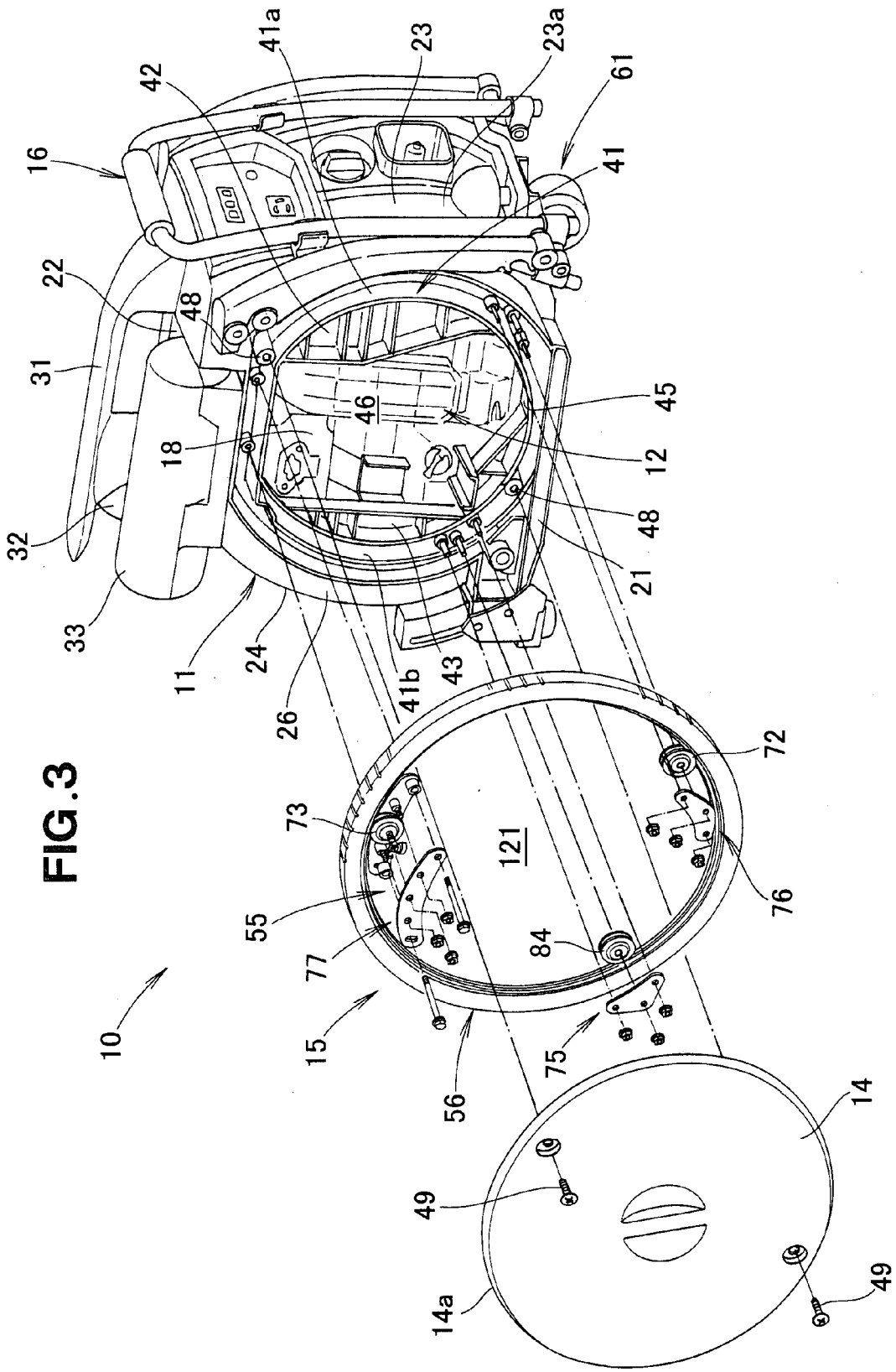
FIG. 3 is an exploded perspective view of the mobile power generator apparatus of the present invention with its carriage unit detached therefrom for clarity.
Figure 4:
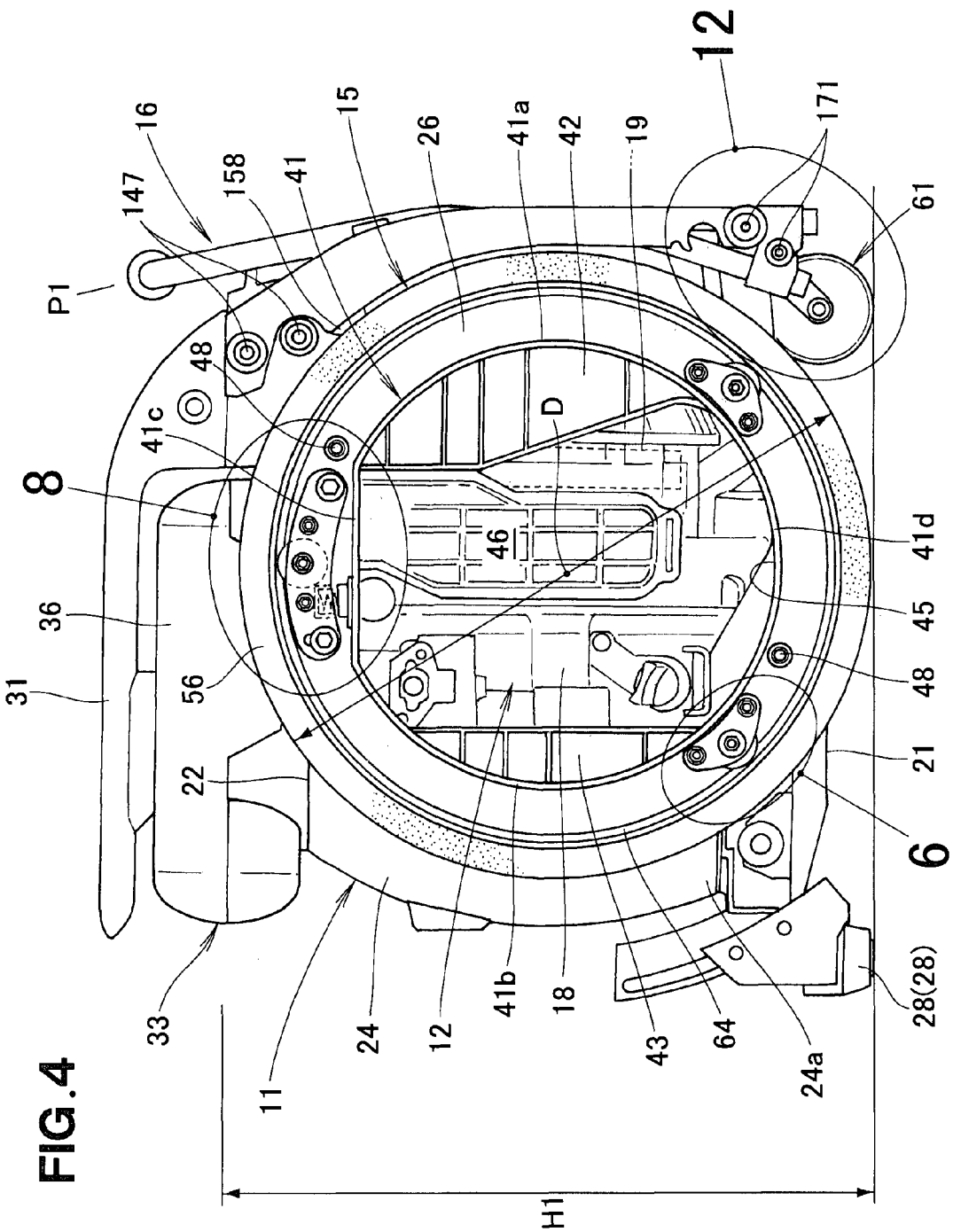
FIG. 4 is a side view of the mobile power generator apparatus of the present invention with its right side cover detached therefrom.

FIG. 3 is an exploded perspective view of the mobile power generator apparatus 10 with is carriage unit detached therefrom for clarity, and FIG. 4 is a side view of the mobile power generator apparatus 10 with the right side cover 14 detached therefrom.

The right side wall 26 of the frame 11 has an outer periphery extending along the bottom wall 21, upper wall 22, front wall 23 and rear wall 24, and a water-resistant wall 41 of a substantially ring shape is provided inwardly and with a predetermined gap from the outer periphery of the right side wall 26. Front resonator 42 is provided on a front end portion 41a of the water-resistant wall 41, while a rear resonator 43 is provided on a rear end portion 41b of the water-resistant wall 41.

Right maintenance opening 45 is defined by upper and lower portions 41c and 41d of the water-resistant wall 41 and front and right resonators 42 and 43. The right maintenance opening 45 is in communication with an accommodating space 46 inside the frame 11 where the engine/power generator unit 12 is accommodated.

Two screw holes 48 are formed in diagonally opposite portions of the water-resistant wall 41, and the right side cover 14 is detachably attached at its circular outer peripheral portion 14a to the right side wall 26 by means of bolts 49 screwed into the screw holes 48.

The outer peripheral portion 14a of the right side cover 14 is slightly greater in size than an outer peripheral portion of the right side cover 14. The right maintenance opening 45 is covered with the right side cover 14 attached to the right side wall 26 by means of the two bolts 49. Thus, by loosing the bolts 49 and detaching the right side cover 14 from the right side wall 26 to thereby open the maintenance opening 45, repair and inspection (maintenance) of the engine/power generator unit 12 can be performed through the maintenance opening 45.

The left side wall 25 is constructed and disposed in left-right symmetric relation to the aforementioned right side wall 26 and thus will not be described in detail. Similarly to the right side wall 26, the left side wall 25 has an outer periphery extending along the bottom wall 21, upper wall 22, front wall 23 and rear wall 24, and a peripheral wall (not shown) is provided inwardly of and with a predetermined gap from the outer periphery of the left side wall 25.

Left maintenance opening (not shown) is defined by the peripheral wall and in communication with the accommodating space 46. The left maintenance opening is covered with the left side cover 13. The left side cover 13 is constructed and disposed in left-right symmetric relation to the right side cover 14 and detachably attached to the left side wall 25 by means of two bolts (not shown). Thus, by loosing the two bolts and detaching the left side cover 13 from the left side wall 25 to thereby open the left maintenance opening, maintenance of the engine/power generator unit 12 can be performed through the left maintenance opening.

The engine/power generator unit 12 comprises the engine 18 drivable with a gas fuel supplied from the cassette gas canister 35, and a power generator 19 mounted coaxially with the drive shaft (crankshaft) as the engine 18. Electric power is generated by the rotor (not shown) of the power generator 19 being rotated by the engine 18.

As the engine 18 is driven, external air is directed into the right maintenance opening 45 through the gap between the right side cover 14 and the water-resistant wall 41, during which time intake sound of the external air can be silenced in a resonating chamber defined by the front and rear resonators 42 and 43.

The carriage unit 15 includes a right guide section 55 attached to the right side wall 26, a right wheel 56 rotatably supported via the right guide section 55, a left guide section (not shown) attached to the left side wall 25, a left wheel 58 (FIG. 2) rotatably supported via the left guide section, and a caster section 61 provided on a lower end portion 23a of the front wall 23.

Because the left guide section is constructed and disposed in left-right symmetric relation to the right guide section 55, the following description mainly describes in detail the right guide section 55 with a detailed description of the left guide section omitted. Further, because the left wheel 58 is constructed and disposed in left-right symmetric relation to the right wheel 56, the following description mainly describes in detail the right wheel 56 with a detailed description of the left wheel 58 omitted.

Figure 5:
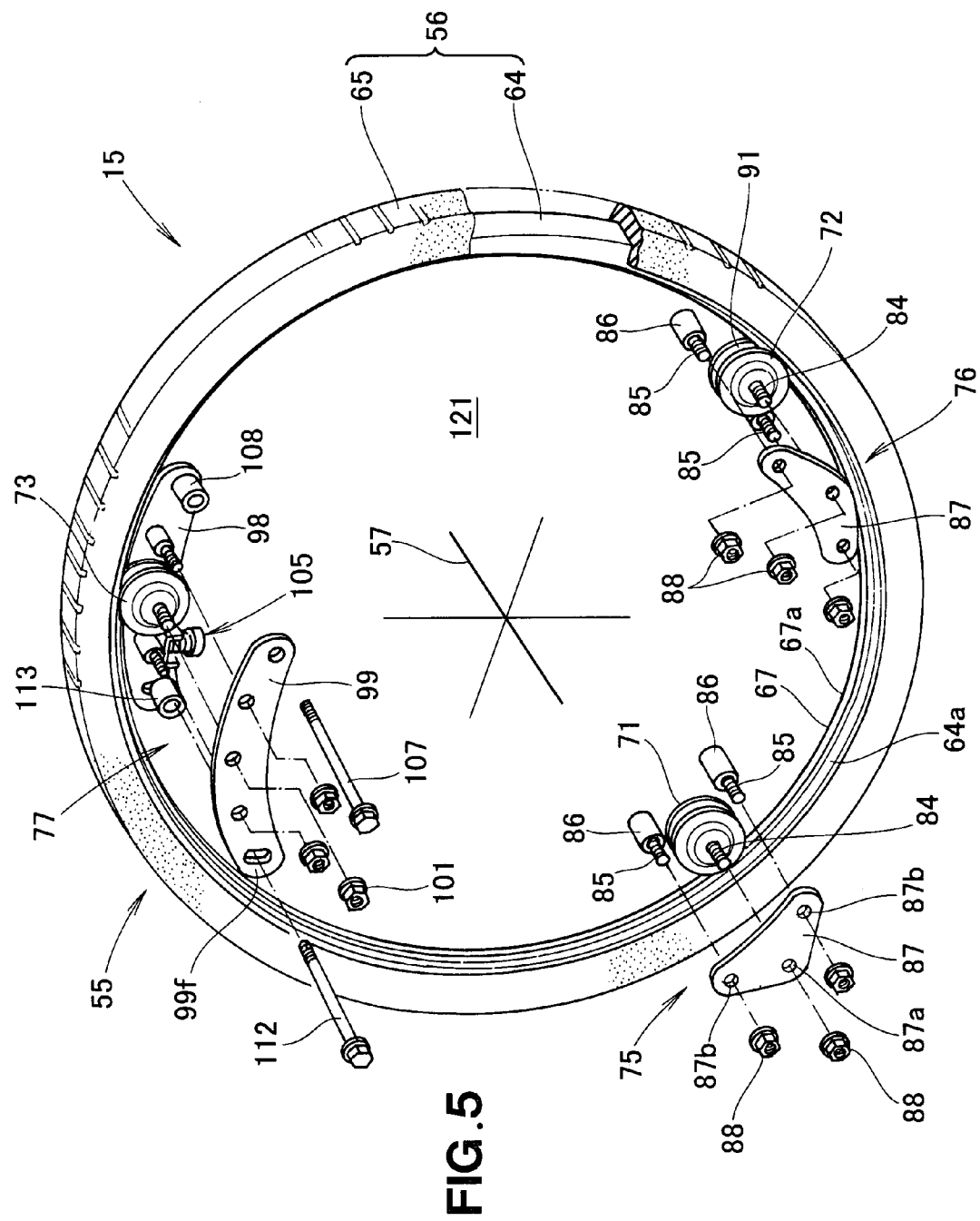
FIG. 5 is a perspective view showing the carriage unit employed in the mobile power generator apparatus of the present invention.

FIG. 5 is a perspective view showing the carriage unit 15 employed in the present invention. The right wheel 56 of the carriage unit 15 includes a ring-shaped rim 64, and a tire disposed on and around the outer periphery of the rim 64. The rim 64 is made, for example, of resin or metal and has a ring-shaped ridge 67 (see also FIG. 7) formed on an inner peripheral wall 64a and projecting radially inward. The rim 64 is supported via the right guide section 55 for rotation about a center axis 57.

The right guide section 55 includes first and second fixed guide rollers 71 and 62, a movable guide roller 73, a first fixedly mounting section 75 for rotatably mounting the first fixed guide roller 71 to the right side wall 26 (see FIG. 4), a second fixedly mounting section 76 for rotatably mounting the second fixed guide roller 72 to the right side wall 26, and a movably mounting section 77 for rotatably mounting the movable guide roller 73 to the right side wall 26.

The first and second fixed guide rollers 71 and 72 and the variable guide rollers 73 are at least three guide rollers employed in the mobile power generator apparatus 10. Because the first and second fixed guide rollers 71 and 72 are identical in construction, the following description will mainly describe in detail the first fixed guide roller 71 with a detailed description of the second fixed guide roller 72 omitted. Further, because the first and second fixedly mounting sections 75 and 76 are identical in construction, the following description will mainly describe the first fixedly mounting section 75 with a detailed description of the second fixedly mounting section 76 omitted; whenever necessary, elements of the second fixedly mounting section 76 will be mentioned using the same reference characters as counterparts of the first fixedly mounting section 75.

Figure 6:
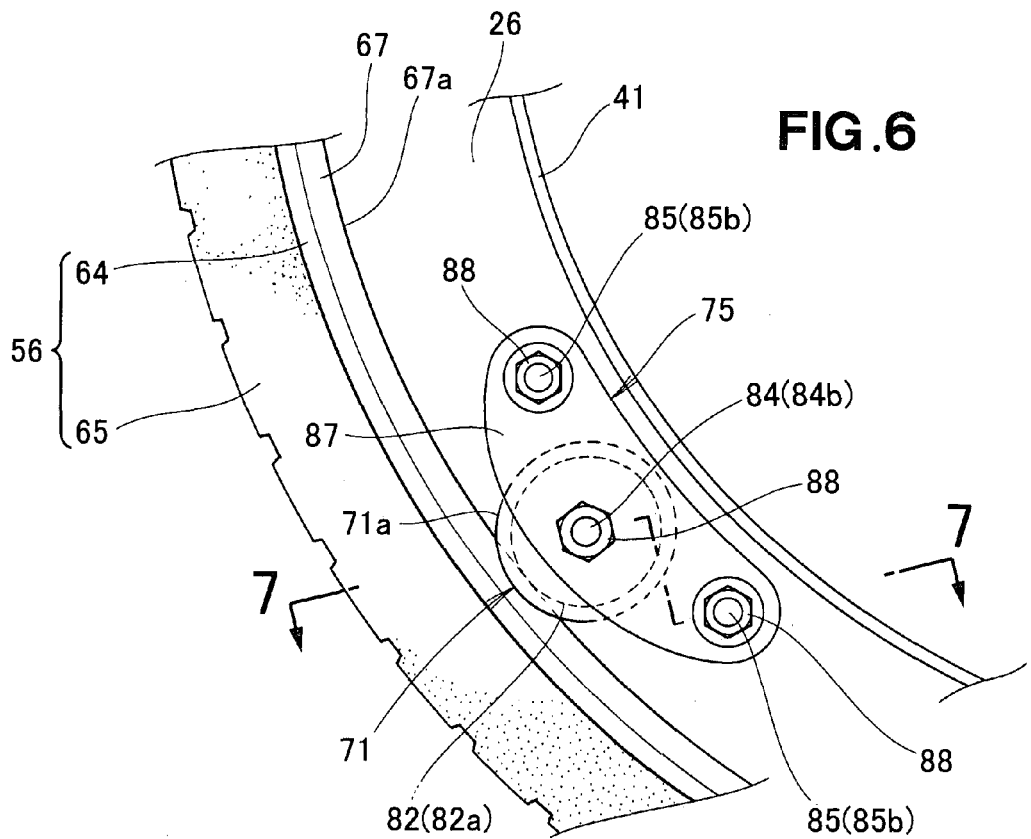
FIG. 6 is an enlarged view of an encircled section 6 of FIG. 4.
Figure 7:
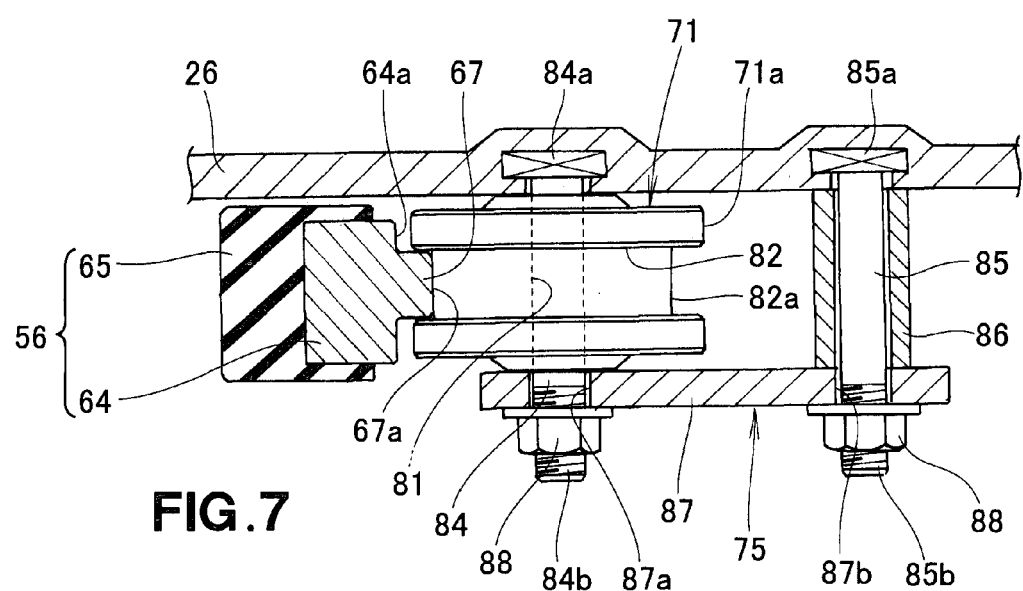
FIG. 7 is a sectional view taken along line 7-7 of FIG. 6.

FIG. 6 is an enlarged view of an encircled section 6 of FIG. 4, and FIG. 7 is a sectional view taken along the 7-7 line of FIG. 6. The first fixed guide roller 71 has a central through-hole 81 for mounting on the first fixedly mounting section 75, and an annular engagement groove or recess 82 formed in the outer periphery 71a for engagement with the ring-shaped ridge 67 of the rim 64.

The first fixedly mounting section 75 includes a fixed-roller supporting bolt 84 for rotatably supporting the guide roller 71, a pair of fixed-plate supporting bolts 85 provided on both sides of the fixed-roller supporting bolt 84 with predetermined intervals from the supporting bolt 84, collars 86 fitted over the corresponding fixed-plate supporting bolts 85, a fixed plate 87 supported by the fixed-plate supporting bolts 85, and nuts 88 for fixing the fixed plate 87 to the fixed-roller supporting bolt 84 and pair of fixed-plate supporting bolts 85.

The fixed-roller supporting bolt 84 has its head 84a embedded in the right side wall 26 so that its shank projects from the right side wall 26 toward the fixed plate 87. The pair of fixed-plate supporting bolts 85, provided on both sides of the fixed-roller supporting bolt 84 and at predetermined intervals from the bolt 84, have their heads 85a embedded in the right side wall 26 so that their shanks project from the right side wall 26 toward the fixed plate 87.

The fixed plate 87 is a flat plate of a substantially triangular shape. The fixed plate 87 has a central through-hole 87a formed centrally therein for insertion therethrough of the fixed-roller supporting bolt 84, and through-holes 87b (see also FIG. 5) formed in its opposite end portions for insertion therethrough of the fixed-plate supporting bolts 85.

In the first fixedly mounting section 75, the mounting hole 81 of the first fixed guide roller 71 is fitted over the fixed-roller supporting bolt 84, and the collars 86 are fit over the corresponding fixed-plate supporting bolts 85. Further, the central through-hole 87a of the fixed plate 87 is fitted over the fixed-roller supporting bolt 84, and the through-holes 87b of the fixed plate 87 is fitted over the fixed-plate supporting bolts 85.

The fixed-roller supporting bolt 84 has a threaded portion 84b projecting out of the central through-hole 87a and screwed into one of the nuts 88, and the fixed-plate supporting bolts 85 have their respective threaded portions 85b projecting out of the through-holes 87b and screwed into the other nuts 88.

Thus, the first fixed guide roller 71 is rotatably supported by the fixed-roller supporting bolt 84 and prevented by the fixed plate 87 from accidentally getting out of engagement with the fixed-roller supporting bolt 84. In such a state, the ridge 67 of the rim 64 fits in the engagement recess 82 of the first fixed guide roller 71, and a bottom surface 82a of the engagement recess 82 is kept in abutment against an inner peripheral surface 67a of the ridge 67.

Referring back to FIG. 5, the second fixed guide roller 72 is identical in construction to the first fixed guide roller 71, and the second fixedly mounting section 76 is identical in construction to the first fixedly mounting section 75. The ridge 67 of the rim 64 fits in an engagement recess 91 of the second fixed guide roller 72, and the bottom surface of the engagement recess 91 is kept in abutment against an inner peripheral surface 67a of the ridge 67. The engagement recess 91 of the second fixed guide roller 72 is identical in shape to the engagement recess 82 of the first fixed guide roller 71.

Figure 8:
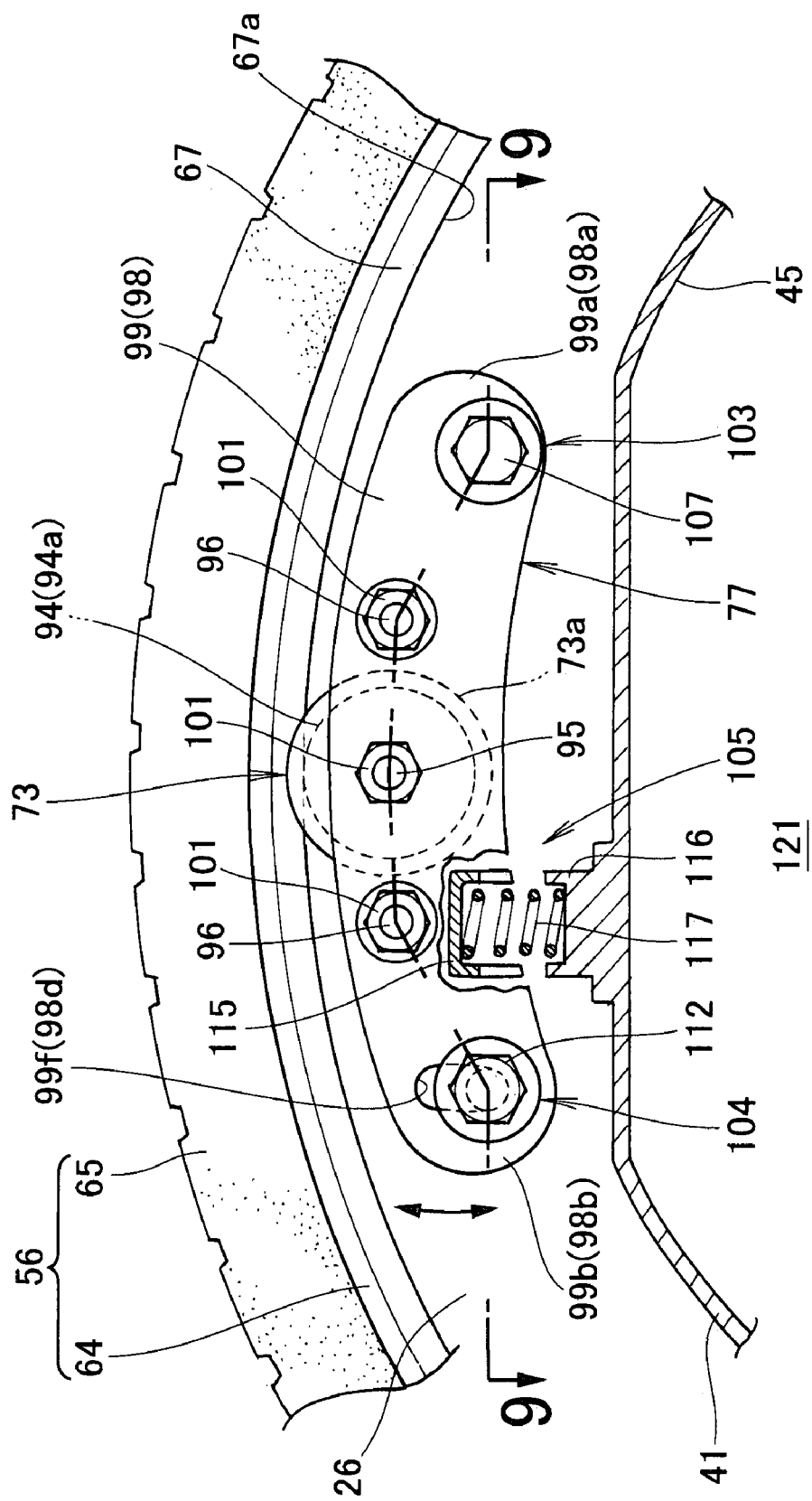
FIG. 8 is an enlarged view of an encircled section 8 of FIG. 4.
Figure 9:
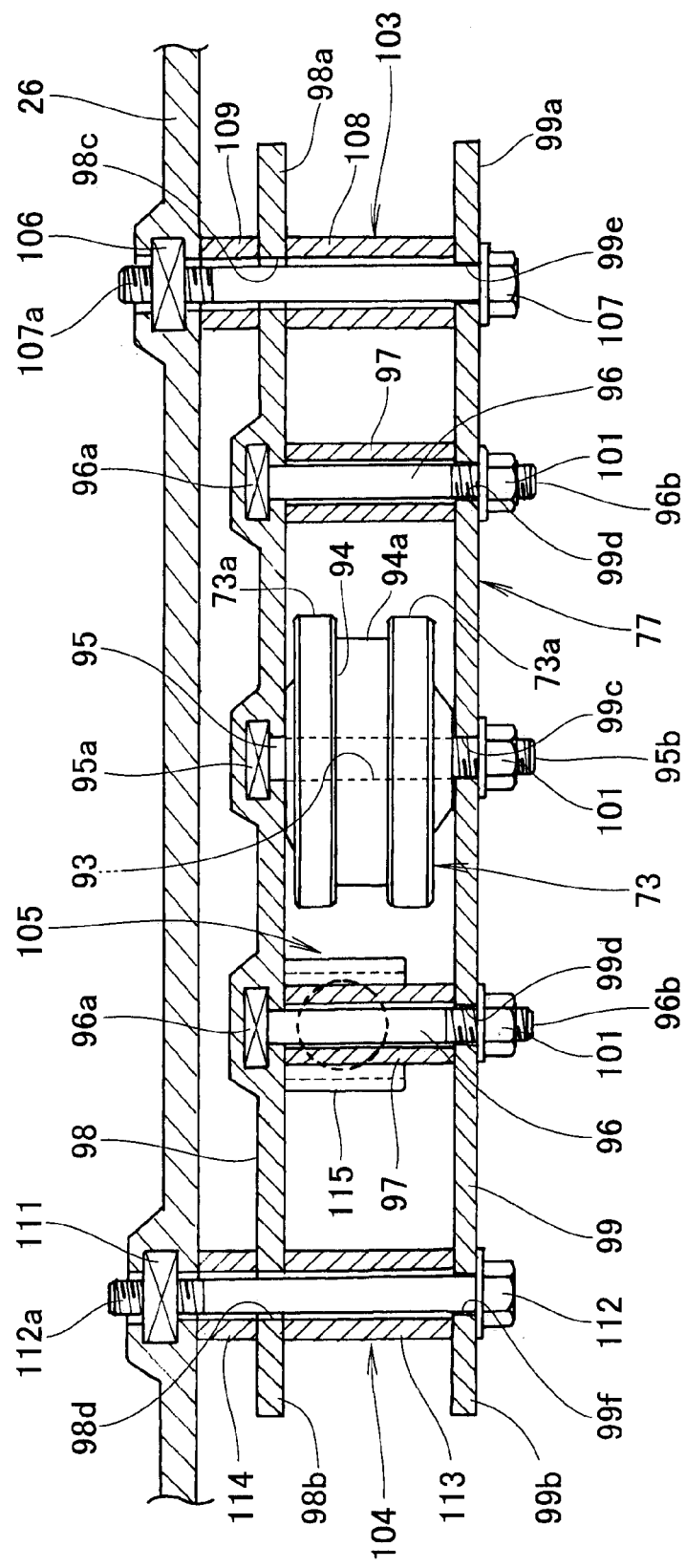
FIG. 9 is a sectional view taken along line 9-9 of FIG. 8.

FIG. 8 is an enlarged view of an encircled section 8 of FIG. 4, and FIG. 9 is a sectional view taken along the 9-9 line of FIG. 8. The movable guide roller 73 has a mounting hole 93 formed centrally through the thickness thereof for mounting the guide roller 73 to the movably mounting section 77, and it has an annular engagement recess 94 formed along the outer periphery 73 thereof for fitting engagement with the ridge 67 of the rim 64. Note that the movable guide roller 73 is identical in shape to the first and second fixed guide rollers 71 and 72.

The movably mounting section 77 includes a movable-roller supporting bolt 95 for rotatably supporting the movable guide roller 73, a pair of movable-plate supporting bolts 96 provided on both sides of the movable-roller supporting bolt 95 with predetermined intervals from the supporting bolt 95, collars 97 fitted over the corresponding movable-plate supporting bolts 96, inner and outer movable plates 98 and 99 supported by the movable-plate supporting bolts 96, and nuts 101 for fixing the inner and outer movable plates 98 and 99 to the movable-roller supporting bolt 95 and pair of movable-plate supporting bolts 96. The movably mounting section 77 also includes a supporting shaft portion 103 for pivotably supporting respective one end portions 98a and 99a of the inner and outer movable plates 98 and 99, a sliding shaft portion 104 for pivotably supporting respective other end portions 98b and 99b of the inner and outer movable plates 98 and 99, and a biasing section 105 for normally urging the movable-roller supporting bolt 95 toward the rim 64.

The movable-roller supporting bolt 95 has its head 95a embedded in the inner movable plate 98 so that its shank projects from the inner movable plate 98 toward the outer movable plate 99. The pair of movable-plate supporting bolts 96, provided on both sides of the movable-roller supporting bolt 95 and at predetermined intervals from the bolt 95, have their heads 96a embedded in the inner movable plate 98 so that their shanks project from the inner movable plate 98 toward the outer movable plate 99.

The inner movable plate 98 is a flat plate of a curved shape. The head 95a of the movable-roller supporting bolt 95 is embedded in a central portion of the inner movable plate 98, and the heads 96a of the movable-plate supporting bolts 96 are embedded in portions, located at both sides of the bolt 95, of the inner movable plate 98. Further, a through-hole 98c is formed in one end portion 98a of the inner movable plate 98, while a slide hole 98d is formed in another end portion 98b of the plate 98.

The through-hole 98c is a hole through which a supporting shaft bolt 107 of the supporting shaft portion 103 is inserted. The slide hole 98d is an elongated hole through which a bolt 112 of the sliding shaft portion 104 is inserted for sliding movement along the edge the slide hole 98d.

The outer movable plate 99 is a flat plate of a curved shape similarly to the inner movable plate 98. The outer movable plate 99 has a central through-hole 99c formed centrally therein, and through-holes 99d formed in its intermediate portions, located on both sides of the central through-hole 99c, for insertion therethrough of the movable-plate supporting bolts 96. Further, a through-hole 99e is formed in one end portion 99a of the outer movable plate 99, while a slide hole 99f is formed in another end portion 99b of the plate 99.

The through-hole 99e is a hole through which the supporting shaft bolt 107 of the supporting shaft portion 103 is inserted. The slide hole 99f is an elongated hole through which the bolt 112 of the sliding shaft portion 104 is inserted for sliding movement along the edge of the slide hole 99f.

The supporting shaft portion 103 includes a supporting shaft nut 106, a supporting shaft bolt 107 screwed in the nut 106, and first and second supporting shaft collars 108 and 109 fitted over the shaft bolt 107. The first supporting shaft collar 108 is inserted through the through-hole 98c of the inner movable plate 98 and through-hole 99e of the outer movable plate 99.

The first supporting shaft collar 108 is sandwiched between the inner and outer movable plates 98 and 99, and the second supporting shaft collar 109 is sandwiched between the inner movable plate 98 and the right side wall 26.

The sliding shaft portion 104 includes a sliding shaft nut 111 embedded in the right side wall 26, a sliding shaft bolt 112 screwed in the nut 111, and first and second sliding shaft collars 113 and 114 fitted over the sliding shaft bolt 112. The sliding shaft bolt 112 is slidably inserted through the slide hole 98d of the inner movable plate 98, and through the slide hole 99f of the outer movable plate 99 for sliding movement along the edge of the slide hole 99f.

The first sliding shaft collar 113 is sandwiched between the inner and outer movable plates 98 and 99, and the second sliding shaft collar 114 is sandwiched between the inner movable plate 98 and the right side wall 26.

The biasing section 105 includes an upper stopper portion 115 provided on the inner movable plate 98, a lower stopper portion 116 provided on the right side wall 26, and a compression spring (resilient member) 117 interposed between the upper and lower stopper portions 115 and 116.

In the movably mounting section 77, the mounting hole 93 of the movable guide roller 73 is fitted over the movable-roller supporting bolt 95, and the collars 97 are fitted over the two movable-plate supporting bolts 96.

Further, the central through-hole 99c of the outer movable plate 99 is fitted over the movable-roller supporting bolt 95, and the through-holes 99d of the outer movable plate 99 are fitted over the two movable-plate supporting bolts 96.

The movable-roller supporting bolts 95 has a threaded portion 95b projecting out of the central through-hole 99c and screwed in one of the nuts 101, and the movable-plate supporting bolts 96 have their threaded portions 96b projecting out of the corresponding through-holes 99d and screwed into the other nuts 101.

Thus, the movable guide roller 73 is rotatably supported by the movable-roller supporting bolt 95 and prevented by the movable plates 98 from accidentally getting out of engagement with the movable-roller supporting bolt 95.

Further, the supporting shaft bolt 107 is inserted through the through-holes 98c and 99e of the inner and outer movable plates 98 and 99, and the first and second supporting shaft collars 108 and 109 are fitted over the supporting shaft bolt 107. Threaded portion 107a of the supporting shaft bolt 107 projecting out of the second supporting shaft collar 109 is screwed in the supporting shaft nut 106.

Further, the sliding shaft bolt 112 is inserted through the slide holes 98d and 99f of the inner and outer movable plates 98 and 99, and the first and second sliding shaft collars 113 and 114 are fitted over the sliding shaft bolt 112. Threaded portion 112a of the sliding shaft bolt 112 projecting out of the second sliding shaft collar 114 is screwed into the sliding shaft nut 111.

Thus, the inner and outer movable plates 98 and 99 are pivotable about the supporting shaft bolt 107 toward and away the rim 64 as indicated by arrows of FIG. 8. In the aforementioned manner, the movable guide roller 73 is supported in such a manner that it is movable in the radial direction of the rim 64.

The compression spring 117 is interposed between the upper and lower stopper portions 115 and 116 so that the movable guide roller 73 is normally pressed against the rim 64 by the biasing force of the compression spring 117. Thus, the engagement recess 94 of the movable guide roller 73 is normally resiliently fitted over the ridge 67 of the rim 64, and the outer periphery 73a of the movable guide roller 73 is normally resiliently abutted against the inner peripheral wall 64a of the rim 64. In the aforementioned manner, it is possible to absorb or accommodate a manufacturing error of the rim 64, and thus, the rim 64 can be rotated smoothly.

As described above, the right wheel 56 is rotatably supported, on the right side wall of the frame 11, by the right wheel 56 (i.e., rim 64) being supported by the first and second fixed guide rollers 71 and 72 and the movable guide roller 73. Therefore, the right wheel 56 can be formed in a large outer diameter D without the height H1 of the frame 11 being increased. In the above-described embodiment, the outer diameter D of the right wheel 56 is set substantially equal to the height H1 of the frame 11.

Further, with the rim 64 rotatably supported via the first and second fixed guide rollers 71 and 71 and movable guide roller 73, the instant embodiment can dispense with a conventional axle used to support the wheel; thus, even where the wheel 56 is formed in a large outer diameter, it is not necessary that the axle extend through a relatively high interior region of the frame 11. Thus, the instant embodiment can secure the space 46 (FIG. 4) for accommodating therein the engine/power generator unit 12 etc. even with the wheel 56 formed in a large outer diameter.

Further, by dispensing with the conventional axle used to support the wheel, the apparatus 10 has a sufficient free space area 121 secured at and around the center of the rim 64 (hereinafter also referred to as "central area 121"). Further, because the central area 121 faces the opening 45 (see also FIG. 4) of the side wall 26, maintenance operation can be performed using the central area 121 of the rim 64 and opening 45 of the side wall 26.

Furthermore, as set forth above, the left guide section of the carriage unit 15 is constructed and disposed in left-right symmetric relation to the right guide section 55, and the left wheel 58 is constructed and disposed in left-right symmetric relation to the right wheel 56. Thus, similarly to the right wheel 56, the left wheel 58 is rotatably disposed on the left side wall 25 of the frame 11.

Referring back to FIGS. 1 and 2, the caster section 61 is provided on the lower end portion 23a of the front wall 23. The caster section 61 includes a pivot shaft 124 rotatably mounted on the front wall 23, a bracket 125 fixed to the pivot shaft 124, a steering wheel 126 rotatably supported on the bracket 125, and a caster stopper 185 fixed to the bracket 125.

Figure 11:
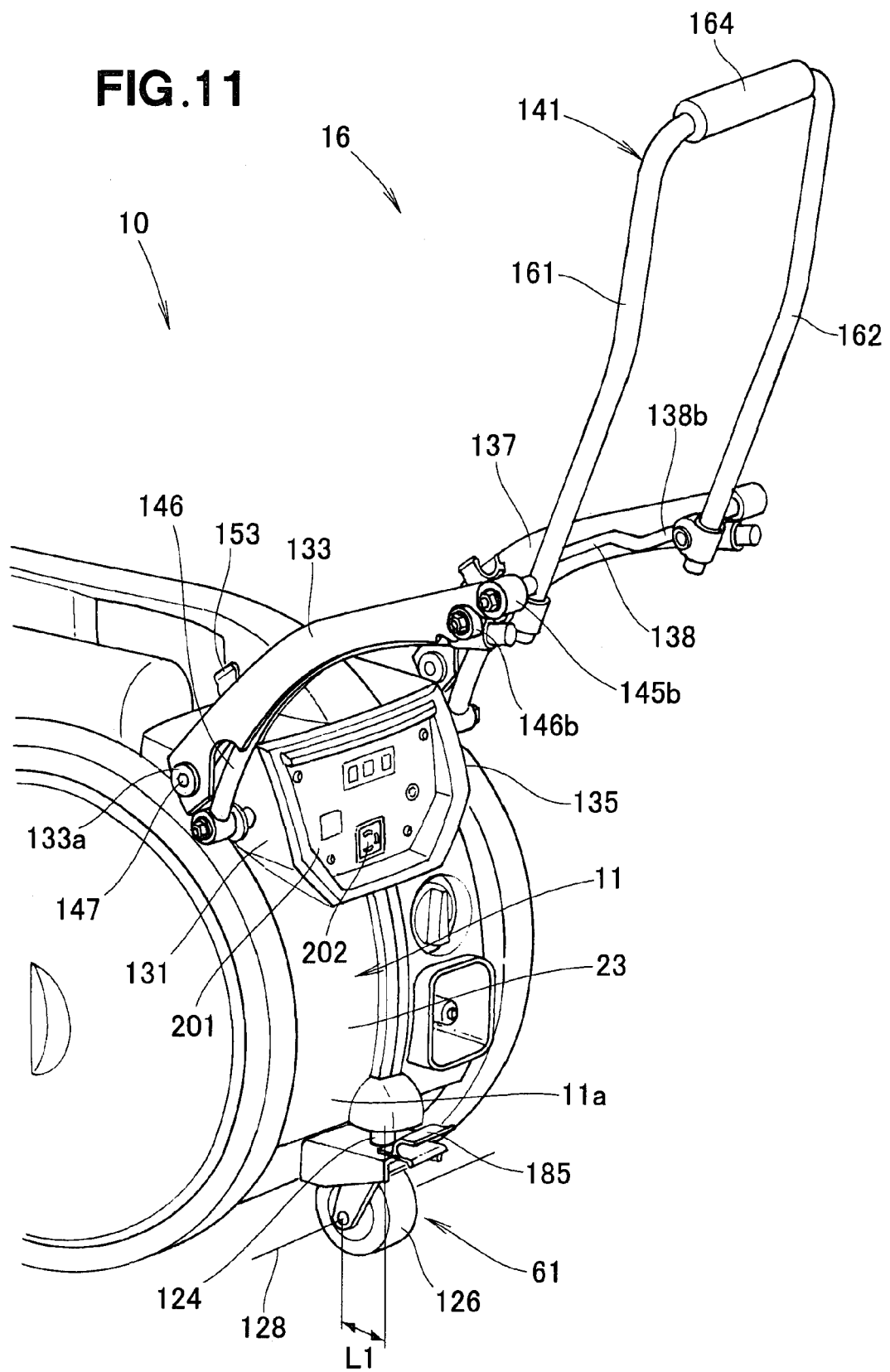
FIG. 11 is a perspective view of the pulling unit in its expanded position.

In the caster section 61, the steering wheel 126 has a centerline 128 offset from a downward extension line of the pivot shaft 124 by a distance L1 as shown in FIG. 1 and FIG. 11 as well.

When the mobile power generator apparatus 10 is to be moved via the left and right wheels 58 and 56, the orientation (i.e., operating direction) of the steering wheel 126 can be changed in accordance with a direction where the mobile power generator apparatus 10 is to be moved (i.e., moving direction of the mobile power generator apparatus 10).

Further, in the caster section 61, the steering wheel 126 is vertically pivotably supported on a support shaft 129 and normally urged downward by a spring member (not shown). Thus, as the mobile power generator apparatus 10 is moved via the left and right wheels 58 and 56 on an uneven ground surface, the steering wheel 126 can be pivotally moved up and down in response to the unevenness of the ground surface.

Because the orientation (i.e., operating direction) of the steering wheel 126 can be changed in accordance with the moving direction of the mobile power generator apparatus 10 and pivotally moved up and down in response to the unevenness of the ground surface, the mobile power generator apparatus 10 can achieve an enhanced mobility and operability.

Further, the steering wheel 126 can be held in a stationary state by a longitudinal middle portion 138c of a lower connecting rod 138 being brought to engagement with the caster stopper 185. Details of the longitudinal middle portion 138c of the lower connecting rod 138 will be discussed later with reference to FIGS. 10 and 11.

Further, in the instant embodiment of the mobile power generator apparatus 10, the left and right leg portions 28 are vertically movably attached to the lower end portion 24a (see FIG. 4) of the rear wall 24. Each of the left and right leg portions 28 can be locked at a stationary position for retaining the mobile power generator apparatus 10 in the stationary state and a moving position for retaining the mobile power generator apparatus 10 in a movable state. The stationary position is a lowered position of the leg portion 28, while the moving position is a raised position of the leg portion 28.

Figure 10:
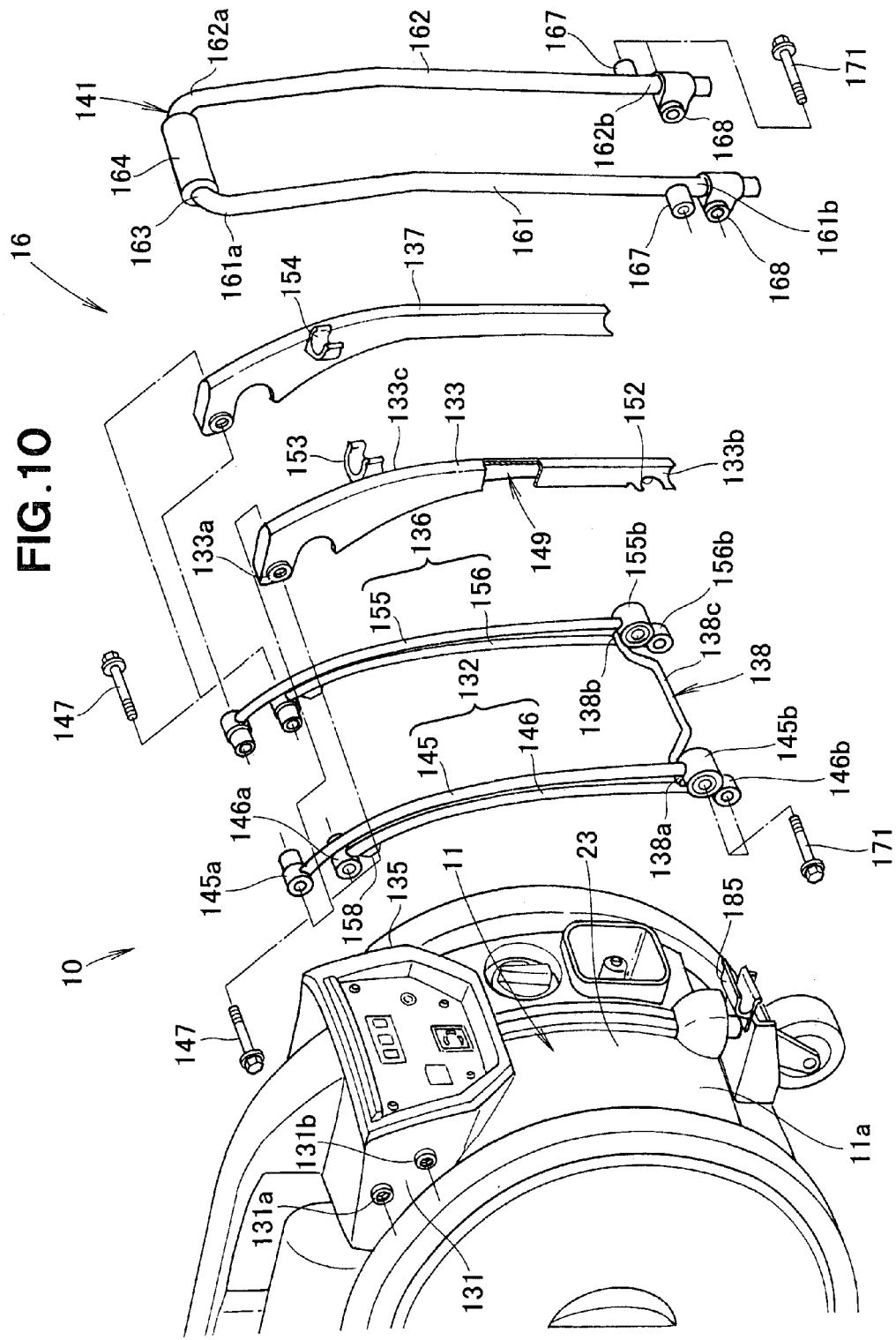
FIG. 10 is an exploded perspective view showing a pulling unit employed in the mobile power generator apparatus of the present invention.

FIG. 10 is an exploded perspective view showing the pulling unit 16 employed in the instant embodiment of the mobile power generator apparatus 10, and FIG. 11 is a perspective view of the pulling unit 16 in an expanded position. The pulling unit 16 is provided on the front section 11a of the frame 11 and operable by the user or human operator to pull and move the mobile power generator apparatus 10.

The pulling unit 16 includes a right pivoting link unit 132 provided on a right side portion 131 of the front section 11a, a right link cover 133 covering the right pivoting link unit 132, a left pivoting link unit 136 provided on a left side portion 35 of the front section 11a, a left link cover 137 covering the left pivoting link unit 136, the above-mentioned lower connecting rod 138 interconnecting the right pivoting link unit 132 and the left pivoting link unit 136, and a pulling handle 141 connected at opposite ends to the right and left pivoting link units 132 and 136.

Because the left and right pivoting link units 136 and 132 are constructed and disposed in left-right symmetric relation to each other, the following description mainly describes in detail the right pivoting link unit 132 with a detailed description of the left pivoting link unit 136 omitted. Further, because the left and right link covers 137 and 133 are constructed and disposed in left-right symmetric relation to each other, the following description mainly describes in detail the right link cover 133 with a detailed description of the left link cover 137 omitted.

The right pivoting link unit 132 includes a right upper pivoting link 145 vertically pivotably supported on the right side portion 131 of the front section 11a, and a right lower pivoting link 146 vertically pivotably supported on the right side portion 131 of the front section 11a. The right upper pivoting link 145 and right lower pivoting link 146 are disposed in vertically proximate and parallel relation to each other.

The right upper pivoting link 145 is formed in a curved shape to extend along the front wall 23 of the frame 11, and it has an upper end portion 145a pivotably connected, by means of a bolt 147, to a first upper mounting portion (upper end portion) 131a of the right side portion 131.

The right lower pivoting link 146 is also formed in a curved shape to extend along the right upper pivoting link 145 and has a right tire stopper 158 provided near its upper end portion 146a and projecting toward the right wheel 56. The right lower pivoting link 146 is pivotably connected at the upper end portion 146a to a second upper mounting portion (upper end portion) 131b of the right side portion 131 by means of a bolt 147. The second upper mounting portion 131b is located slightly forwardly and downwardly of the first upper mounting portion 131a.

As shown in FIG. 4, the right tire stopper 158 is a member that abuts against the outer periphery of the right wheel 56 when the pulling handle 141 is in a collapsed position. By the right tire stopper 158 abutting against the outer periphery of the right wheel 56, the rotation of the wheel 56 can be prevented. Namely, unintended rotation of the wheel 56 can be prevented reliably by the simple construction calling for only the tire stopper 158.

The right lower pivoting link 146 is located immediately below and parallel to the right upper pivoting link 145. The right lower pivoting link 146 and right upper pivoting link 145 are supported together for integral vertical pivoting movement about their respective upper end portions 146a and 145a.

The right lower pivoting link 146 and right upper pivoting link 145 are covered with the right link cover 133. The right link cover 133 has an upper end portion 133a that is pivotably connected, by means of the bolt 147, to the first upper mounting portion 131a along with the upper end portion 145a of the right upper pivoting link 145, and the right link cover 133 is fixed at its lower end portion 133b to a lower end portion (lower boss) 145b of the right upper pivoting link 145.

Figure 14:
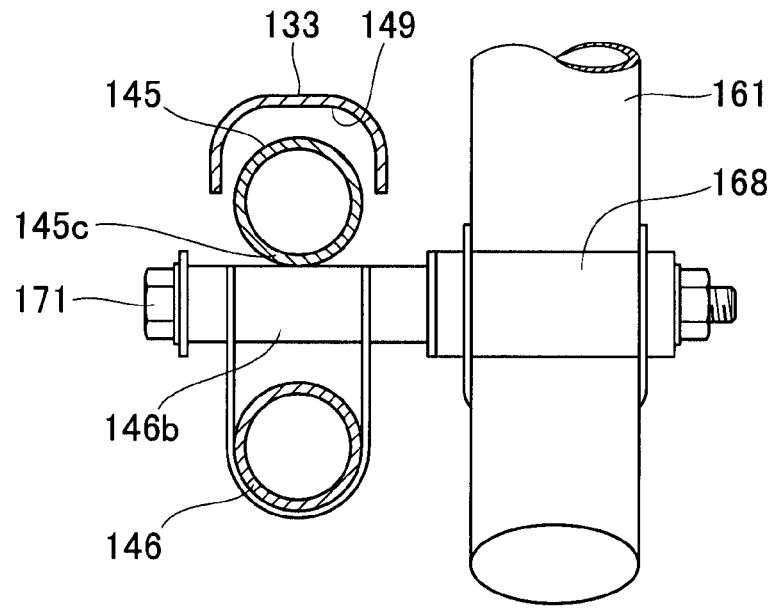
FIG. 14 is a sectional view taken along line 14-14 of FIG. 13.

The right link cover 133 has a substantially U cross-sectional shape and has the right upper and right lower pivoting links 145 and 146 accommodated in its interior space 149 (see also FIG. 14). The right link cover 133 has a handle holder 153 formed on a substantial longitudinal middle portion of an inner wall thereof. The handle holder 153 has a substantially U cross-sectional shape so as to sandwichingly hold a right handle section 161 of the pulling handle 141.

Figure 12:
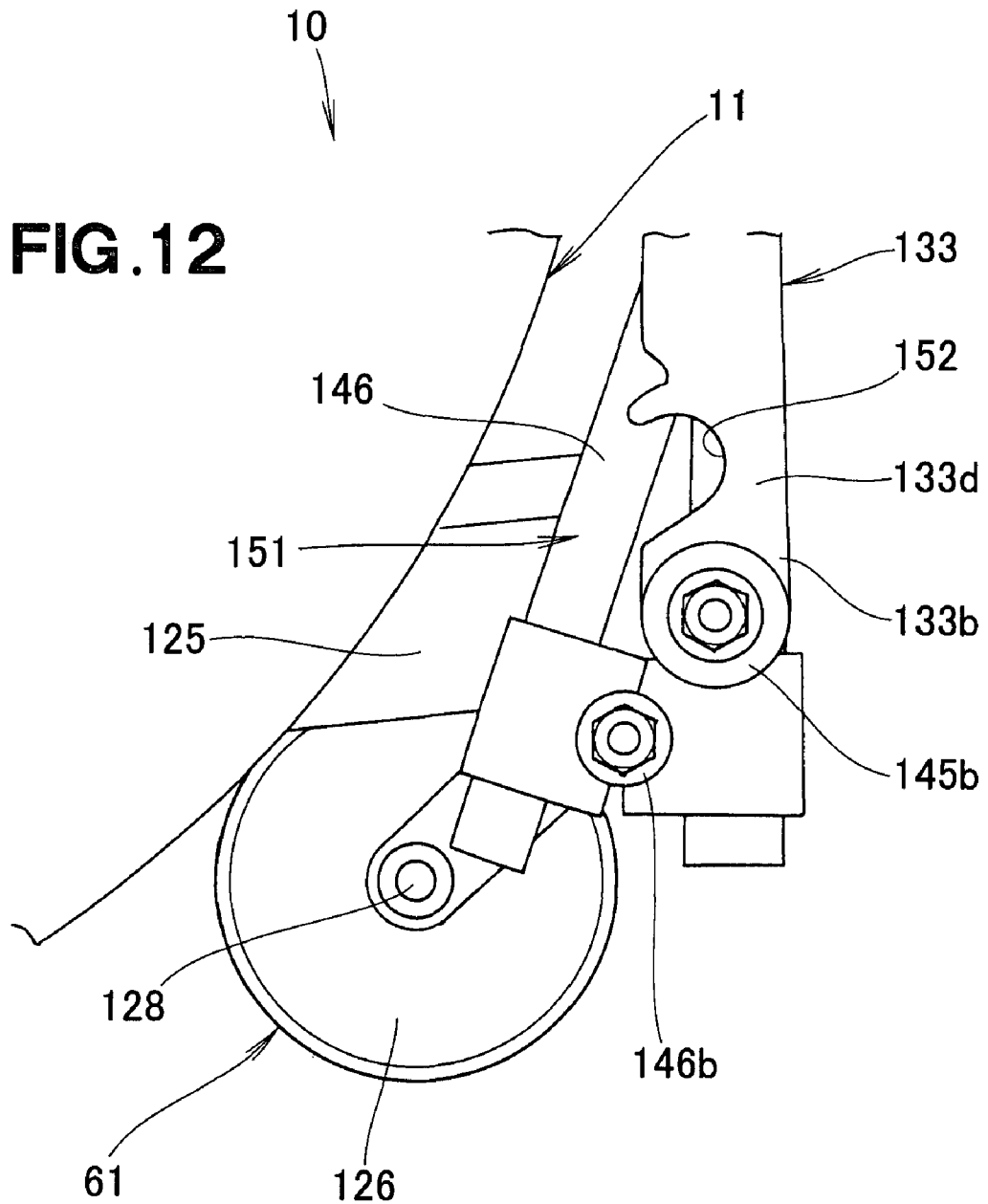
FIG. 12 is an enlarged view of an encircled section 12 of FIG. 4.

FIG. 12 is an enlarged view of an encircled section 12 of FIG. 4. The right link cover 133 has a retaining recess (i.e., first engaging element) 152 formed in the lower end portion 133d of its outer wall 133d. The retaining recess 152 has a curved shape such that it can engage a lower end portion (or lower boss) (i.e., second engaging element) 146b of the right lower pivoting link 146. The retaining recess 152 and lower end portion (or lower boss) 146b of the right lower pivoting link 146 together constitute a right handle retaining mechanism 151. Details of the right handle retaining mechanism 151 will be discussed later with reference to FIGS. 13-15.

Referring back to FIGS. 10 and 11, the lower end portion 145b of the right upper pivoting link 145 and lower end portion 155b of a left upper pivoting link 155 are interconnected via the above-mentioned lower connecting rod 138.

More specifically, the lower connecting rod 138 has a right end portion 138a connected to the lower end portion 145b of the right upper pivoting link 145, and a left end portion 138b connected to a lower end portion 155b of the left upper pivoting link 155.

The longitudinal middle portion 138c of the lower connecting rod 138 is bent to project forward, so that the middle portion 138c is located at a position where it can engage with the caster stopper 185. The right handle section 161 of the pulling handle 141 is connected to the lower end portion 145b of the right upper pivoting link 145 and lower end portion 146b of the right lower pivoting link 146.

Further, a left handle section 162 of the pulling handle 141 is connected to the lower end portion 155b of the left upper pivoting link 155 and lower end portion 156b of the left lower pivoting link 156.

The pulling handle 141 includes the above-mentioned right handle section 161 located inwardly of the right link cover 133, i.e. closer to the longitudinal centerline of the mobile power generator apparatus 10 than the right link cover 133 (see also FIG. 2), the above-mentioned left handle section 162 located inwardly of the left link cover 137, i.e. closer to the longitudinal centerline of the mobile power generator apparatus 10 than the left link cover 137 (see also FIG. 2), a connecting section 163 interconnecting respective distal ends 161a and 162a of the right and left handle sections 161 and 162, and a movable grip section 164 provided concentrically with the connecting section 163.

The right handle section 161 is located closer to the longitudinal centerline of the mobile power generator apparatus 10 than the right link cover 133 with a predetermined interval from the right upper pivoting link 145 and right lower pivoting link 146.

The right handle section 161 has first and second lower mounting portions 167 and 168 formed on its proximal end portion 161b. The right handle section 161 is pivotably connected at the first lower mounting portion 167 to the lower end portion 145b of the right upper pivoting link 145 by means of a bolt 171, and also pivotably connected at the second lower mounting portion 168 to the lower end portion 146b of the right lower pivoting link 146 by means of a bolt 171.

The left handle section 162 is constructed and disposed in left-right symmetric relation to the right handle section 161, and thus, the following description mainly describes in detail the right handle section 161 with a detailed description of the left handle section 162 omitted; whenever necessary, elements of the left handle section 162 will be mentioned using the same reference characters as counterparts of the right handle section 161.

Namely, in the pulling handle 141, the right handle section 161 is connected at its proximal end portion 161b to the respective lower end portions 145b and 146b of the right upper pivoting link 145 and right lower pivoting link 146 in such a manner that the right handle section 161 is movable in interlocked relation to the pivoting links 145 and 146, and similarly the left handle section 162 is connected at its proximal end portion 162b to the respective lower end portions 155b and 156b of the left upper pivoting link 155 and left lower pivoting link 156 in such a manner that the left handle section 162 is movable in interlocked relation to the pivoting links 155 and 156. Further, the movable grip section 164 is provided on the connecting section 163 interconnecting the respective distal ends 161a and 162a of the right and left handle sections 161 and 162.

The pulling unit 16 is also constructed so that the pulling handle 141 is expandable, in a direction where the movable grip section 164 moves away from the right and left pivoting link units 132 and 136, in interlocked relation to upward pivotal movement of the link units 132 and 136 responsive to a pulling force applied to the grip section 164 by the human operator.

Also, the pulling unit 16 is constructed so that the pulling handle 141 is collapsable in a direction where the movable grip section 164 moves toward the right and left pivoting link units 132 and 136 in interlocked relation to downward pivotal movement of the link units 132 and 136 responsive to a pushing force applied to the grip section 164 by the human operator.

Namely, the pulling unit 16 is collapsable or bendable at its substantial longitudinal middle portion. Further, the right and left pivoting link units 132 and 136 each have a length substantially equal to a length of the pulling handle 141. Thus, the pulling unit 16 can have a sufficiently increased overall length when it is in the expanded position and a reduced overall length when it is in the collapsed (or retracted) position.

Further, in the pulling handle 141, the right handle section 161 is connected at the first and second lower mounting portions 167 and 168 to the lower end portions 145b and 146b, respectively, of the right upper pivoting link 145 and right lower pivoting link 146, and the left handle section 162 is connected at the first and second lower mounting portions 167 and 168 to the lower end portions 155b and 156b, respectively, of the left upper pivoting link 155 and left lower pivoting link 156.

Namely, the right handle section 161 is connected at the proximal end portion 161b to the lower end portions 145b and 146b of the right upper pivoting link 145 and right lower pivoting link 146, while the left handle section 162 is connected at the proximal end portion 162b to the lower end portions 155b and 156b of the left upper pivoting link 155 and left lower pivoting link 156.

Thus, the pulling handle 141 is prevented from moving independently of the lower end portions 145b and 146b and lower end portions 155b and 156b. Consequently, when the pulling handle 141 is moved or shifted to the collapsed or expanded position, the movement of the pulling handle 141 can be controlled or regulated by the right and left pivoting link units 132 and 136 in such a manner that the movable grip section 164 moves in a fixed or predetermined trajectory 181 (FIG. 18A).

Figure 13:
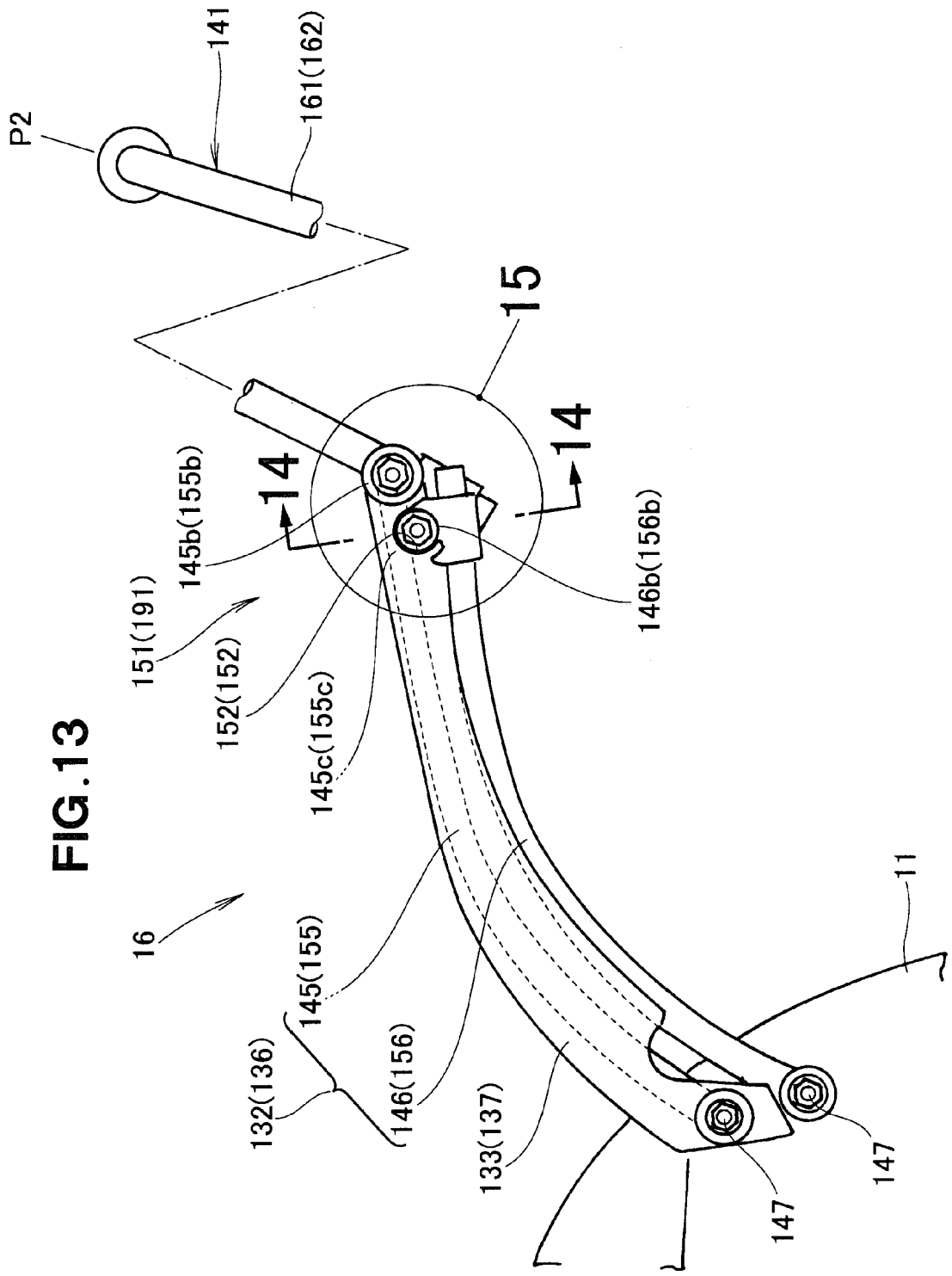
FIG. 13 is a side view showing the pulling unit in the expanded position.
Figure 15:
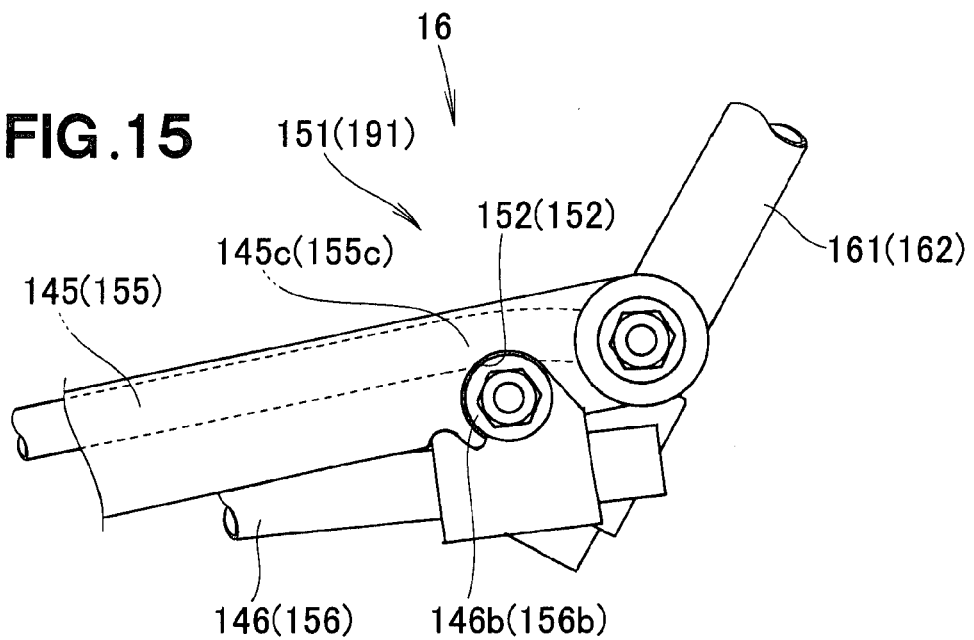
FIG. 15 is an enlarged view of an encircled section 15 of FIG. 13.

FIG. 13 is a side view showing the pulling unit 16 of the mobile power generator apparatus 10 in the expanded position, FIG. 14 is a sectional view taken along the 14-14 line of FIG. 13, and FIG. 15 is an enlarged view of an encircled section 15 of FIG. 13.

As the pulling handle 141 is expanded so that the movable grip section 164 is shifted from a retracted position P1 (FIG. 4) to a pulling position P2 for the human operator to pull and move the mobile power generator apparatus with the grip, the right lower pivoting link 146 engages with the right upper pivoting link 145, while the left lower pivoting link 156 engages with the left upper pivoting link 155.

More specifically, the lower end portion (lower boss) 146b of the right lower pivoting link 146 engages with a region 145c of the right upper pivoting link 145 near the lower end portion 145b. The lower end portion (lower boss) 146b is oriented toward the near-lower-end region 145c. Thus, the lower end portion 146b can be reliably abutted against the near-lower-end region 145c of the right upper pivoting link 145.

Similarly, the lower end portion (lower boss) 156b of the left lower pivoting link 156 engages with a region 155c of the left upper pivoting link 155 near the lower end portion 155b. The lower end portion (lower boss) 156b is oriented toward the near-lower-end region 145c. Thus, the lower end portion 156b can be reliably abutted against the near-lower-end region 155c of the left upper pivoting link 155.

With such arrangements, the pulling handle 141 can be prevented from being expanded beyond the pulling position P2. Thus, the instant embodiment can dispense with a separate stopper that was required in the prior art to prevent the pulling handle 141 from being expanded beyond the pulling position, and consequently, the instant embodiment of the mobile power generator apparatus 10 can be simplified in construction.

The pulling unit 16 further includes right and left handle retaining mechanisms 151 and 191. The right handle retaining mechanism 151 has a retaining recess 152, and it includes the lower end portion (lower boss) 146b of the right lower pivoting link 146. The left handle retaining mechanism 191 is constructed and disposed in left-right symmetric relation to the right handle retaining mechanism 151, and thus, the following description mainly describes in detail the right handle retaining mechanism 151 with a detailed description of the left handle retaining mechanism 191 omitted; whenever necessary, elements of the left handle retaining mechanism 191 will be mentioned using the same reference characters as counterparts of the right handle retaining mechanism 151.

As the pulling handle 141 is expanded so that the movable grip section 164 is shifted to the pulling position P2 where the human operator can pull the movable grip section 164, the lower end portion (lower boss) 146b of the right lower pivoting link 146 is fitted into the retaining recess 152 (i.e., the first and second engaging elements 152 and 146b are brought to a mutually-engaging position) while the lower end portion (lower boss) 156b of the left lower pivoting link 156 is fitted into the left retaining recess 152 (i.e., the first and second engaging elements 152 and 156b are brought to a mutually-engaging position). In this way, the pulling handle 141 can be prevented from being accidentally or unintentionally collapsed by the weights of the pulling handle 141, right and left pivoting link units 132 and 136, etc.

Figure 16:
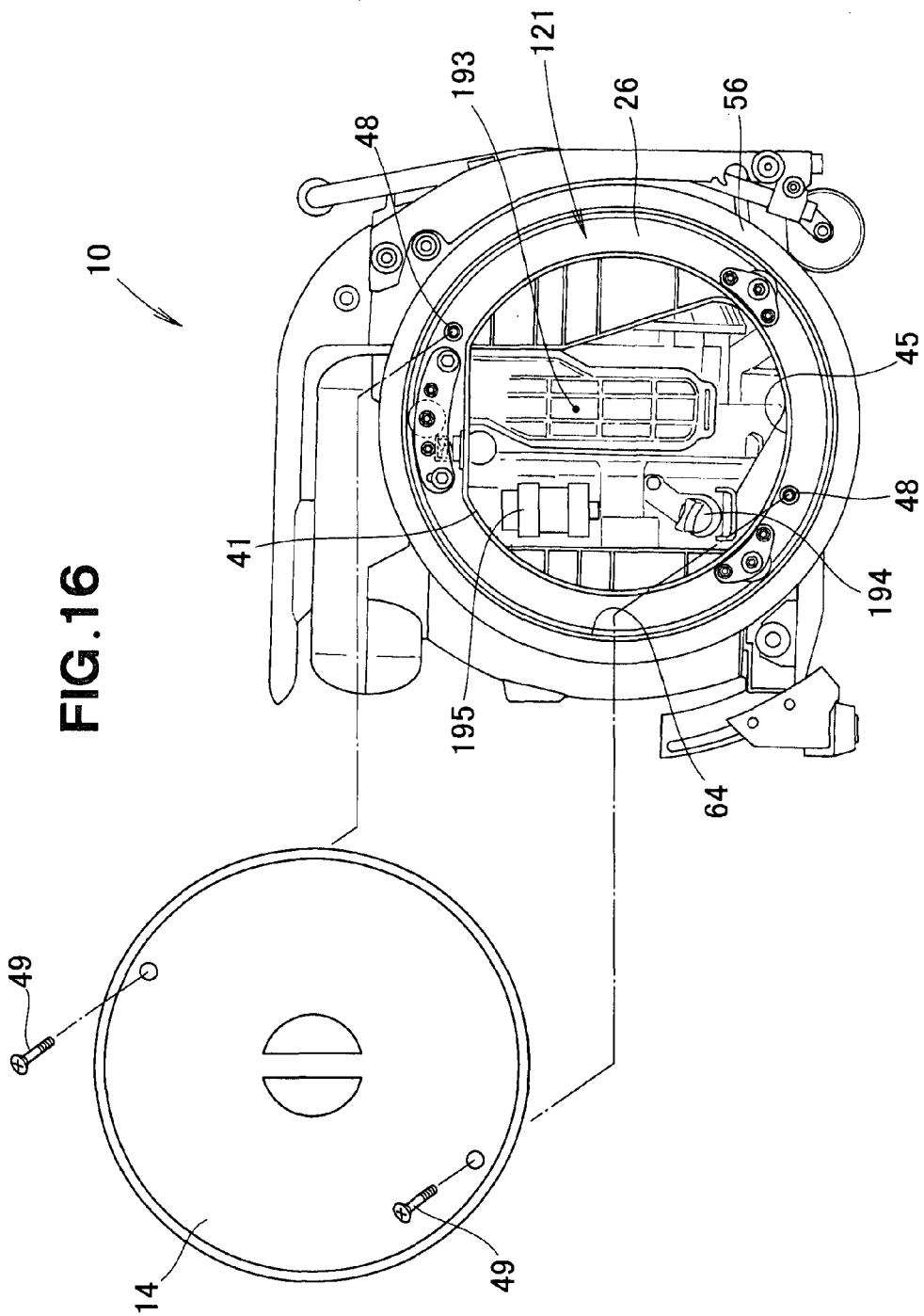
FIG. 16 is a view explanatory of an example manner in which maintenance (repair and inspection) of the mobile power generator apparatus is performed.

Next, with primary reference to FIG. 16, a description will be given about an example manner in which maintenance (repair and inspection) of the mobile power generator apparatus 10 is performed. First, the two bolts 49 are removed from the screw holes 48, and then the right side cover 14 is detached from the right side wall section 26 to open the central area 121 of the rim 64 and opening 45.

Air cleaner 193 of the engine 18, engine oil cap 194, carburetor 195, mixer (not shown), etc. are provided at positions facing the maintenance opening 45. Thus, with the maintenance opening 45 opened in the aforementioned manner, it is possible to replace an element of the air cleaner 193, remove the engine oil cap 194 to thereby replace engine oil, and replace the carburetor 195 and mixer. The mixer is a device that mixes the gas fuel, supplied from the cassette canister 35, with air introduced via the air cleaner and feeds a resultant fuel/air mix into the cylinder of the engine 18.

Thus, maintenance (repair and inspection) of the mobile power generator apparatus 10 can be performed through the central area 121 and maintenance opening 45.

Next, with reference to FIGS. 17 to 21, a description will be given about an example of how to pull and move the mobile power generator apparatus 10 using the pulling unit 16 after shifting the pulling unit 16 from the collapsed position P1 to the pulling position P2. In FIGS. 17 to 21, only the construction of the right side of the pulling unit 16 is shown with the construction of the left side of the pulling unit 16 omitted, to simplify illustration and facilitate understanding of the pulling unit 16.

FIGS. 17A and 17B are views explanatory of how the pulling unit 16 is shifted to the expanded position; FIG. 17B is an enlarged view of an encircled section 17b of FIG. 17A. In FIG. 17A, the pulling unit 16 is shown as being in the collapsed position P1. The lower end portion (lower boss) 146b of the right lower pivoting link 146 is located below the retaining recess 152. Under this condition, the human operator starts expanding the pulling unit 16 by gripping the movable grip section 164 with a hand 198 and pulling the pulling unit 16 toward the pulling position P2 (see FIG. 19) as indicated by arrow A. During that time, the right upper and right lower pivoting links 145 and 146 pivot upward about the bolts 147 as indicated by arrow B. At the same time, the lower end portion (lower boss) 146b of the right lower pivoting link 146 angularly moves about the lower end portion (lower boss) 145b of the right upper pivoting link 145 as indicated by arrow C of FIG. 17B.

FIGS. 18A and 18B are views showing the pulling unit 16 having been expanded partway; FIG. 18B is an enlarged view of an encircled section 18b of FIG. 18A. As the human operator continues to pull the movable grip section 164 toward the pulling position P2 as indicated by arrow A, the movable grip section 164 continues to move in the predetermined trajectory 181. During that time, the right upper and right lower pivoting links 145 and 146 continue to pivot upward about the bolts 147 as indicated by arrow B, and the lower end portion (lower boss) 146b of the right lower pivoting link 146 angularly moves toward the retaining recess 152.

Figure 19:
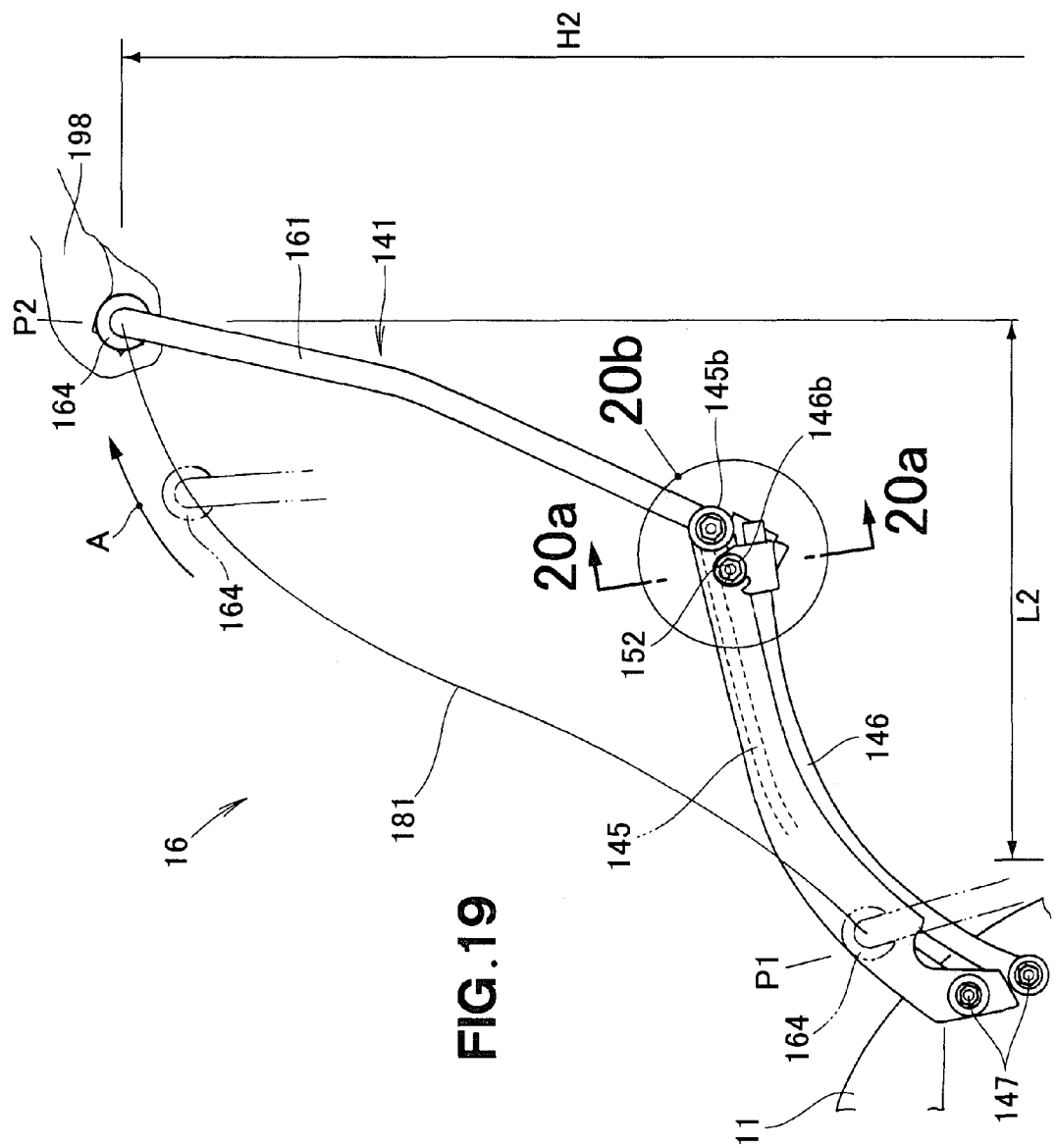
FIG. 19 is a view showing the pulling unit having been expanded to the pulling position.

FIG. 19 is a view showing the pulling unit 16 having been expanded to the pulling position P2. By the human operator further pulling the movable grip section 164 toward the pulling position P2 as indicated by arrow A, the movable grip section 164 further moves in the predetermined trajectory 181 to reach the pulling position P2.

Figure 20A:
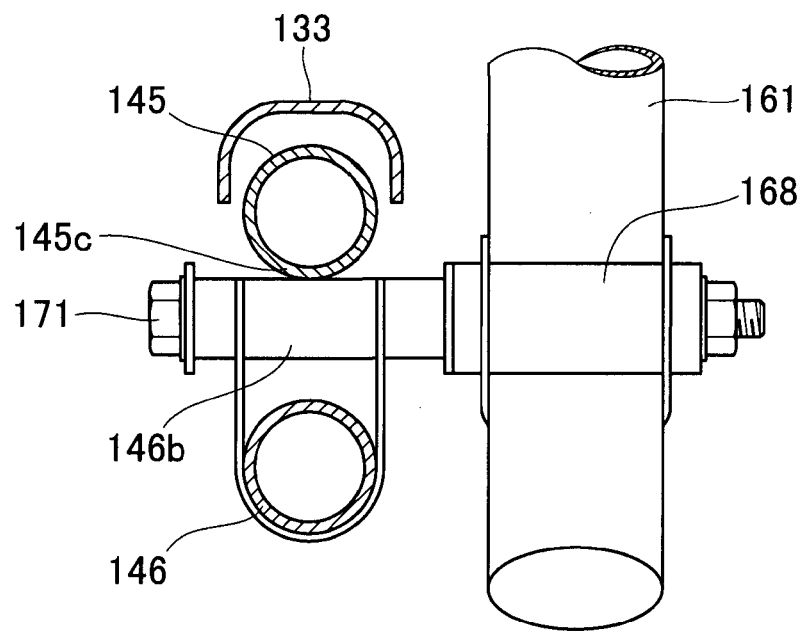
FIGS. 20A and 20B are views showing the pulling unit retained in the pulling position.
Figure 20B:
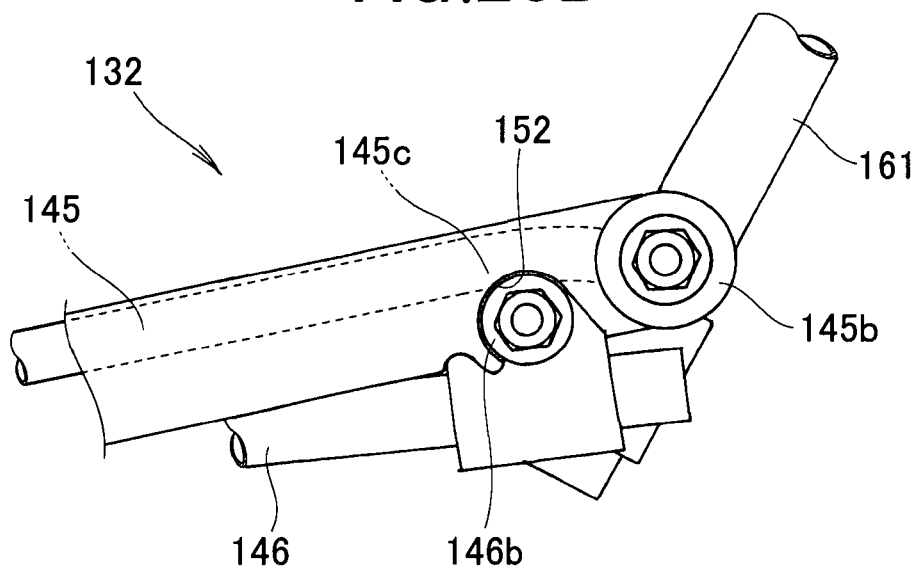

FIGS. 20A and 20B are views showing the pulling unit 16 retained in the pulling position P2. More specifically, FIG. 20A is a sectional view taken along the 20a-20a line of FIG. 19, and FIG. 20B is an enlarged view of an encircled portion 20b of FIG. 19.

The lower end portion (lower boss) 146b of the right lower pivoting link 146 engages with the near-lower-end region 145c of the right upper pivoting link 145. Thus, the pulling handle 141 can be prevented from being expanded beyond the pulling position P2.

At the same time the lower end portion (lower boss) 146b of the right lower pivoting link 146 engages with the near-lower-end region 145c, the lower end portion (lower boss) 146b of the right lower pivoting link 146 fits into the retaining recess 152 of the right handle retaining mechanism 151.

In this way, the pulling handle 141 can be prevented from being accidentally or unintentionally collapsed due to the weights of the pulling handle 141, pivoting link units 132, etc. Thus, the movable grip section 164 can be retained in the pulling position P2 even while the human operator's hand is off the grip section 164. As a consequence, the instant embodiment can enhance the usability of the mobile power generator apparatus 10.

Referring back to FIG. 19, the pulling unit 16 is bendable at its substantial longitudinal middle portion. Further, the right and left pivoting link units 132 and 136 each have a length substantially equal to the length of the pulling handle 141. Thus, the pulling unit 16 can have an increased overall length by being expanded to the expanded position.

Further, as the pulling handle 141 is expanded, the right upper and right lower pivoting links 145 and 146 pivot upward about the bolts 147, so that the lower end portions (lower bosses) 145b and 146b of the right lower pivoting links 145 and 146 move upward. Thus, the pulling handle 141 connected with the lower end portions (lower bosses) 145b and 146b is lifted, so that the movable grip section 164 of the pulling handle 141 can be located at a high position H2.

Further, because the right upper and right lower pivoting links 145 and 146 pivot upward about the bolts 147 as the pulling handle 141 is expanded, the lower end portions (lower bosses) 145b and 146b of the right lower pivoting links 145 and 146 move forward, and thus, the pulling handle 141 connected with the lower end portions (lower bosses) 145b and 146b also moves forward. By the pulling handle 141 moving forward like this, the movable grip section 164 of the pulling handle 141 can be located at a relatively great distance L2 from the frame 11.

Figure 21:
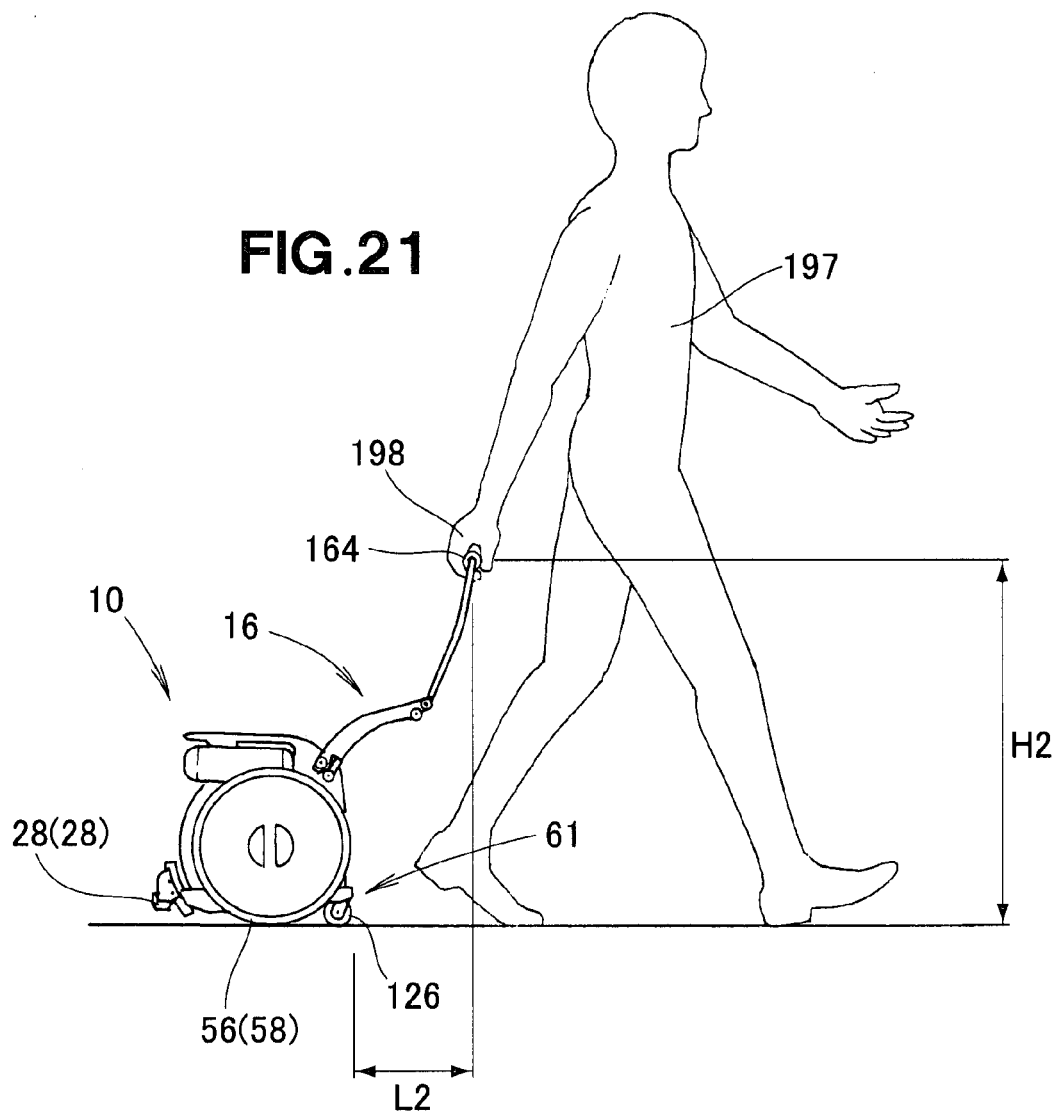
FIG. 21 is a view explanatory of an example manner in which the mobile power generator apparatus is pulled by a human operator via the pulling unit.

FIG. 21 is a view showing an example manner in which the mobile power generator apparatus 10 is pulled by the human operator with the pulling unit 16. As illustrated in the figure, the human operator 197 walks forward gripping the movable grip section 164 with the hand 198. In this way, the right and left wheels 56 and 58 rotate, and thus, the mobile power generator apparatus 10 can be pulled forward. During that time, the left and right leg portions 28 are kept locked in the moving position, and the movable grip section 164 is held at the high position H2. Namely, the movable grip section 164 of the pulling handle 141 shifted to the expanded position can be held at a suitable height appropriate to the height of the human operator (especially, human operator's hand).

Further, in the state shown in FIG. 11, the movable grip section 164 is located forwardly of and at the great distance L2 from the frame 11, and thus, the body of the mobile power generator apparatus 10 is located at a sufficient distance from the human operator, which can prevent the human operator 197 from contacting the body of the mobile power generator apparatus 10.

Because the movable grip section 164 of the pulling handle 141 shifted to the expanded position can be held at a suitable height appropriate to the height of the human operator and the human operator 197 can be prevented from contacting the body of the mobile power generator apparatus 10, the instant embodiment can achieve an enhanced mobility and operability of the mobile power generator apparatus 10.

As the mobile power generator apparatus 10 is pulled by the human operator, the steering wheel 126 can be changed in orientation in accordance with a moving direction of the power generator apparatus 10 and moved up and down in accordance with unevenness of the ground surface. As a consequence, the mobility of the mobile power generator apparatus 10 can be even further enhanced.

Next, with reference to FIGS. 22 to 24, a description will be given about an example manner in which the pulling unit 16 of the mobile power generator apparatus 10 is shifted from the pulling position P2 to the collapsed position P1. In FIGS. 22 to 24, only the construction of the right side of the pulling unit 16 is shown with the construction of the left side of the pulling unit 16 omitted, to simplify illustration and facilitate understanding of the pulling unit 16.

Figure 22A:
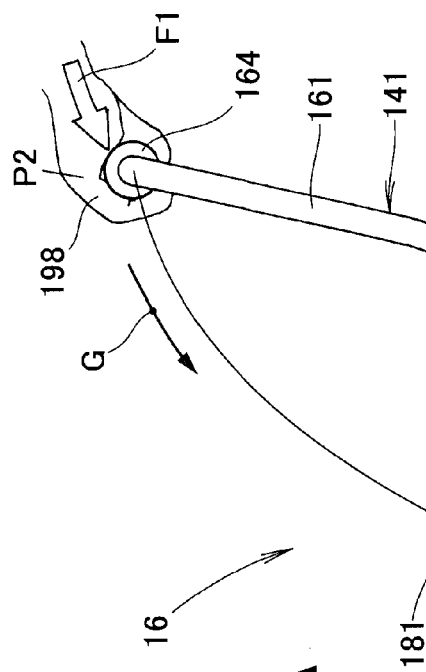
FIGS. 22A and 22B are views explanatory of an example manner in which the pulling unit is collapsed from the expanded position.
Figure 22B:
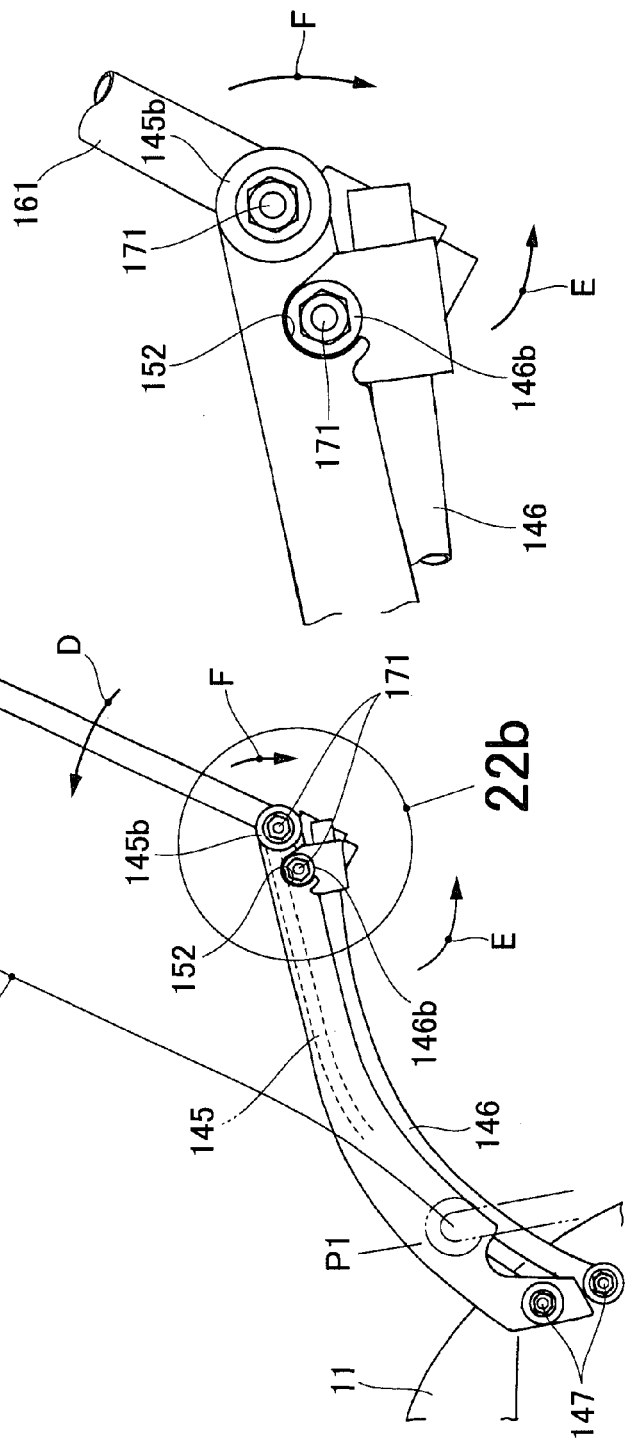
Figure 23:
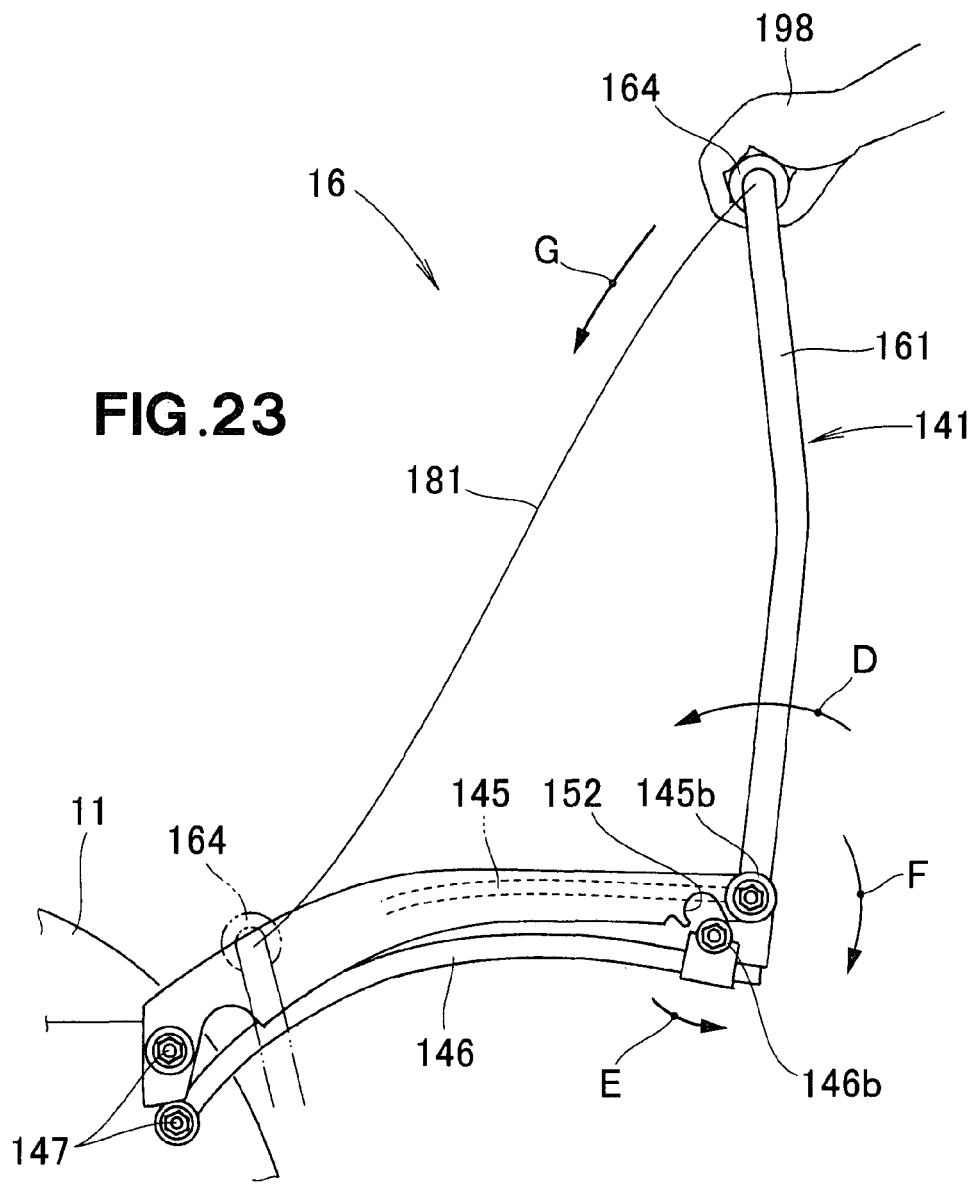
FIG. 23 is a view showing the pulling unit having been collapsed partway.

FIGS. 22A and 22B are views showing an example manner in which the pulling unit 16 is collapsed from the expanded position; FIG. 22B is an encircled portion 22b of FIG. 22A. As the movable grip section 164 is pushed with a force as indicated by arrow F1, the pulling handle 141 pivots as indicated by arrow D about its proximal end portion, more specifically about the lower end portion (lower boss) 145b of the right upper pivoting link 145, and simultaneously the lower end portion (lower boss) 146b of the right lower pivoting link 146 pivots as indicated by arrow E about the lower end portion (lower boss) 145b of the right upper pivoting link 145. By pivoting as indicated by arrow E, the lower end portion (lower boss) 146b of the right lower pivoting link 146 gets out of engagement with, and thus is released from retention by, the retaining recess 152 of the right link cover 133.

Then, the right upper pivoting link 145 and the right lower pivoting link 146 start pivoting downward as indicated by arrow F about the bolts 147 due to the weights of the pulling handle 141, pivoting link unit 132, etc. Thus, the movable grip section 164 starts collapsing toward the collapsed (or retracted) position P1 in the predetermined trajectory 181 as indicated by arrow G.

FIG. 23 is a view showing the pulling unit 16 having been collapsed partway. In this state, the right upper pivoting link 145 and the right lower pivoting link 146 further pivot downward as indicated by arrow F due to the weights of the pulling handle 141, pivoting link unit 132, etc. Thus, the movable grip section 164 further moves toward the collapsed (or retracted) position P1 in the predetermined trajectory 181 as indicated by arrow G.

Figure 24B:
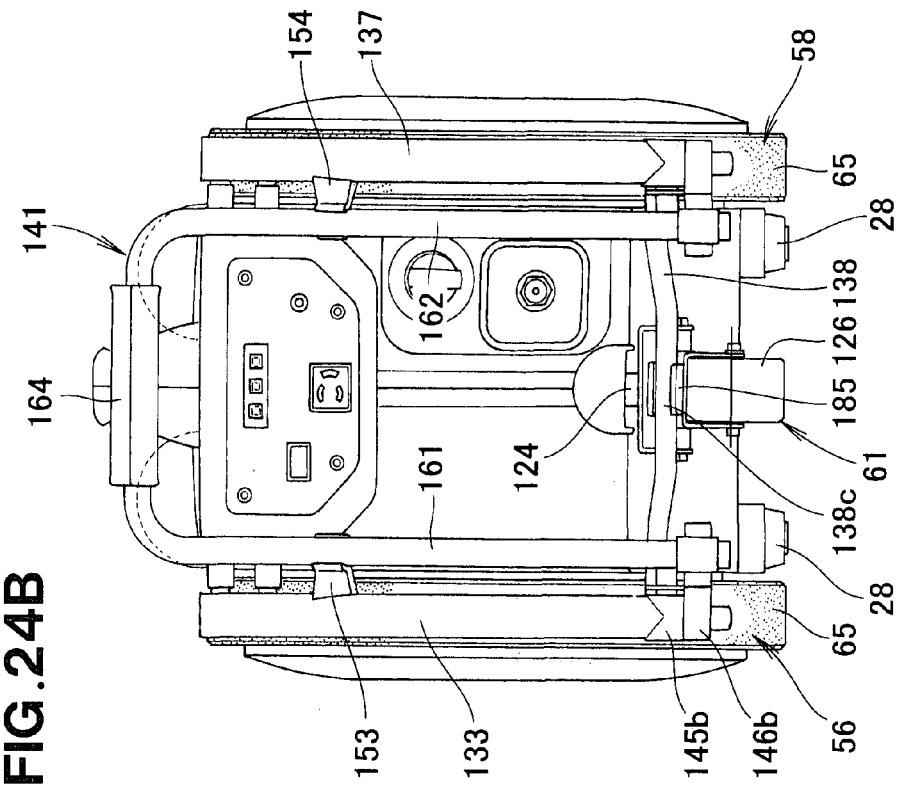
FIGS. 24A and 24B are views showing the pulling unit having been collapsed to a collapsed position.
Figure 24A:
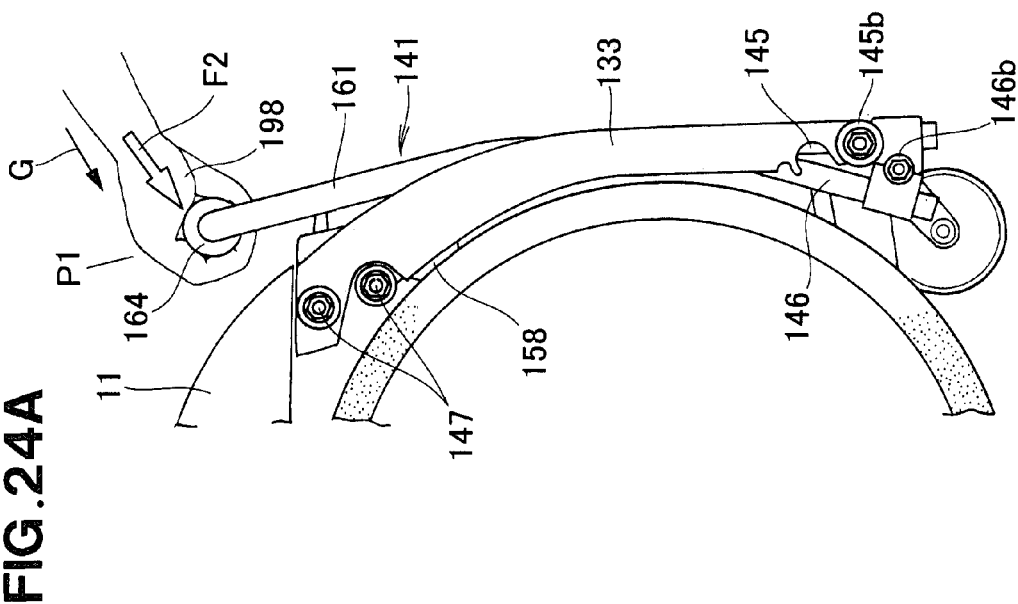

FIGS. 24A and 24B are views showing the pulling unit 16 having being collapsed to the collapsed position P1. As shown in FIG. 24A, the movable grip section 164 moves in the predetermined trajectory 181 (see FIG. 23) as indicated by arrow G to reach a position immediately short of the collapsed (or retracted) position P1. Then, the human operator pushes the movable grip section 164 toward the frame 11 as indicated by arrow F2.

Thus, as shown in FIG. 24B, the right handle section 161 is engaged by the handle holder 153 of the right link cover 133, while the left handle section 162 is engaged by the handle holder 154 of the left link cover 137. In this way, the pulling handle 141 can be retained in the collapsed position P1 (see FIG. 24A).

As described above in relation to FIGS. 17-24, the mobile power generator apparatus 10 is constructed in such a manner that the movable grip section 164 moves in the predetermined trajectory 181 (see FIGS. 19 and 22) as the pulling handle 141 is shifted from the collapsed position P1 to the expanded position P2. Thus, the human operator 197 can readily collapse/expand the pulling handle 141 by just shifting the hand 198, gripping the movable grip section 164, along the predetermined trajectory 181. As a result, the operation to be performed by the human operator 197 to collapse/expand the pulling handle 141 can be facilitated, which can significantly enhance the usability of the power generator apparatus 10.

Further, the movement trajectory 181 of the movable grip section 164 is preferably set to extend from the collapsed (or retracted) position P1 to the expanded position P2 with a substantially constant upward gradient (more specifically a substantially S-shaped upward gradient), as seen in FIG. 19. Thus, the pulling handle 141 can be readily expanded from the collapsed position P1 to the expanded position P2 by the human operator 197 merely pulling the movable grip section 164 obliquely upward. Thus, the operation for expanding the pulling handle 141 can be even further facilitated, which can even further enhance the usability of the power generator apparatus 10.

Then, the pulling handle 141 is retained in the collapsed position P1 where it is engaged by the handle holders 153 and 154, and the longitudinal middle portion 138c of the lower connecting rod 138 engages the caster stopper 185. In this way, the steering wheel 126 of the caster section 61 can be prevented from undesirably pivoting about the pivot shaft 124 and moving up and down.

Further, because not only the pulling handle 141 is engaged by the handle holders 153 and 154 but also the right tire stopper 158 abuts against the outer periphery of the right tire 65, unintended rotation of the right wheel 56 can be prevented reliably by the right tire stopper 158. Similarly, the left tire stopper (not shown) abuts against the outer periphery of the left tire 65. Thus, unintended rotation of the left wheel 58 can be prevented by the left tire stopper.

Also, the left and right leg portions 28 are lowered to the stationary position, so that the mobile power generator apparatus 10 can be stably held in a stationary state.

Figure 25A:
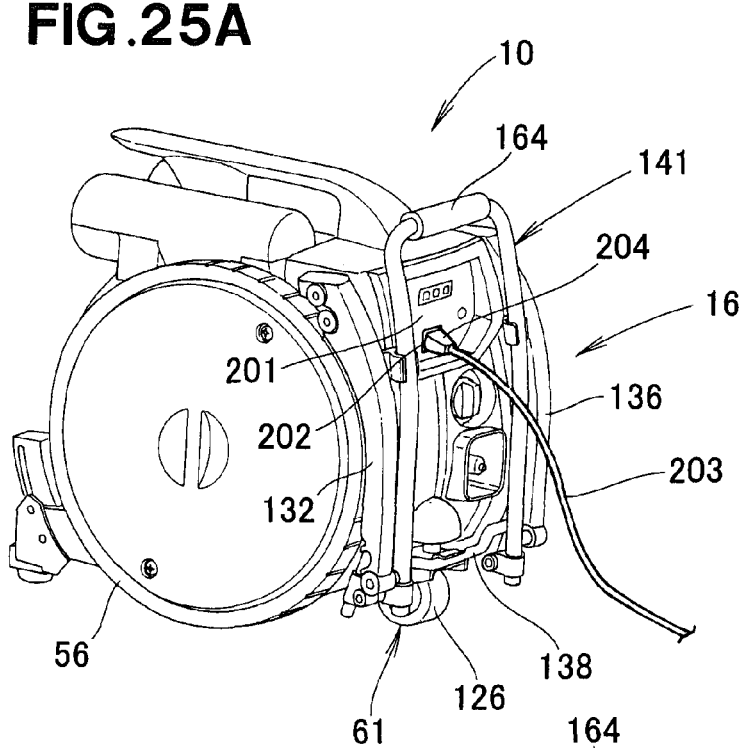
FIGS. 25A and 25B are views explanatory of an example manner in which a power cord is moved away from the left and right wheels by means of the pulling unit.
Figure 25B:
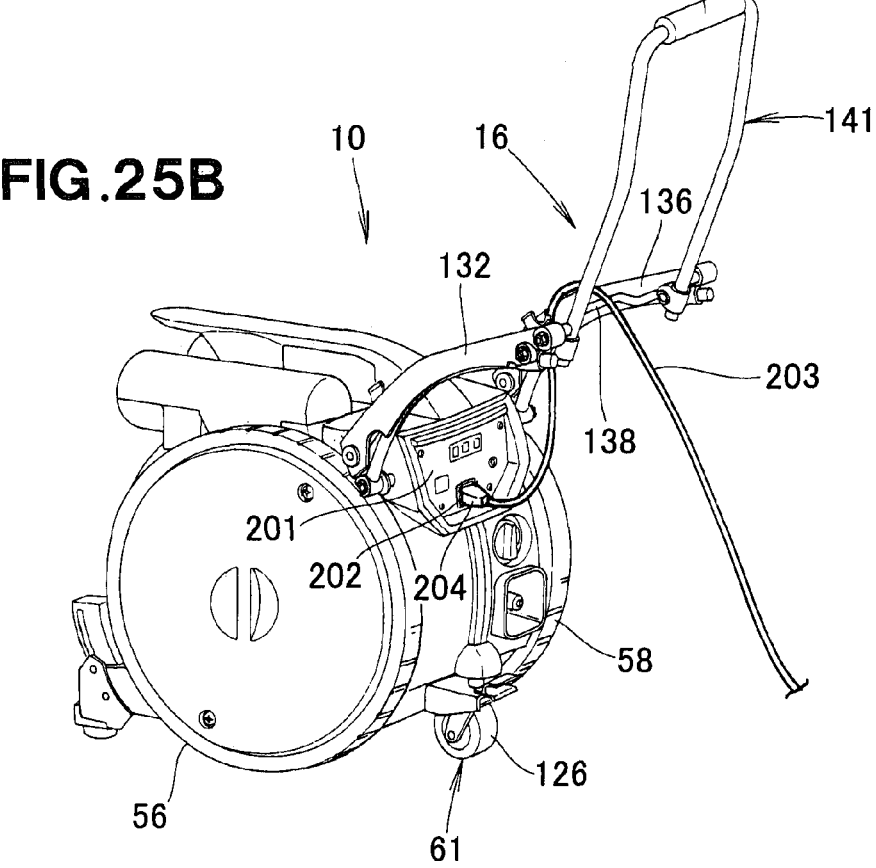

FIGS. 25A and 25B are views explanatory of an example manner in which a power cord is moved away from the left and right wheels by means of the pulling unit 16. Output terminal 202 is provided on an operation panel 201 of the mobile power generator apparatus 10. Electric power generated by the power generator apparatus 10 can be output by a plug of the power cord 203 being inserted in the output terminal 202. Sometimes, the human operator may want to or move the mobile power generator apparatus 10 with the plug 204 of the cord 202 kept inserted in the output terminal 202.

As the pulling handle 141 of the pulling unit 16 is expanded from the collapsed position, the lower connecting rod 138 ascends to lift the power cord 203. Thus, the power cord 203 can be moved away from the left and right wheels by means of the pulling unit 16, so that it can be prevented from undesirably getting tangled with the left and right wheels 58 and 56.

Whereas the preferred embodiment has been described above in relation to the case where the pulling unit 16 is provided with the right and left link covers 133 and 137, the present invention is not so limited, and the right and left link covers 133 and 137 may be dispensed with.

Further, whereas the preferred embodiment has been described above in relation to the case where the movement trajectory 181 of the movable grip section 164 is set to extend from the collapsed (or retracted) position P1 to the expanded position P2 with a substantially constant upward gradient (more specifically a substantially S-shaped upward gradient), the present invention is not so limited, and the movement trajectory 181 may be modified in any desired, suitable manner.

Further, the preferred embodiment has been described above as preventing the pulling handle 141 from being expanded beyond the pulling position P1, by causing the lower end portion (lower boss) 146b of the right lower pivoting link 146 to engages with (or abut against) the near-lower-end region 145c of the right upper pivoting link 145 and causing the lower end portion (lower boss) 156b of the left lower pivoting link 156 to engage with (or abut against) the near-lower-end region 155c of the left upper pivoting link 155. Alternatively, the pulling handle 141 may be prevented from being expanded beyond the pulling position P1 in any other desired suitable manner, such as by causing respective longitudinal middle portions, rather than the lower end portions and near-lower-end regions, of the pivoting links to engage with each other. In another alternative, a stopper member or the like may be provided to prevent the pulling handle 141 from being expanded beyond the pulling position P1.

Furthermore, whereas the preferred embodiment has been described above in relation to the case where each of the right and left handle retaining mechanisms 151 and 191 comprises the retaining recess 152 and the lower end portion (lower boss) 146b or 156b of the lower pivoting link 146 or 156, the handle retaining mechanisms 151 and 191 may be constructed in another desired suitable manner than the above-described.

Furthermore, the shapes of the frame 11, pulling handle 141, right upper and lower pivoting links 145 and 146, upper and lower pivoting links 155 and 156, etc. may be modified as desired rather than being limited to those illustrated in the figures.

The present invention is well-suited for application to mobile power generator apparatus where the power generator is mounted in a frame and a pulling handle for moving the power generator is mounted to the frame.

Obviously, various minor changes and modifications of the present invention are possible in light of the above teaching. It is therefore to be understood that within the scope of the appended claims the invention may be practiced otherwise than as specifically described.

What is claimed is:

1. A mobile power generator apparatus comprising:
   a frame having a power generator mounted therein; and
   a pulling unit provided on the frame and operable by a human operator to pull and move the mobile power generator apparatus, the pulling unit comprising:
   an upper pivoting link and a lower pivoting link disposed in vertically proximate relation to each other, the upper and lower pivoting links being pivotally connected at their respective one end portions to the frame to undergo pivotal movement in a vertical plane;
   a pulling handle having a grip section provided on a distal end portion thereof, the pulling handle being pivotally directly connected at a proximal end portion thereof to respective other end portions of the upper and lower pivoting links; and,
   a link cover having a substantially U-shaped cross section and having an interior space accommodating therein the upper and lower pivoting links, the link cover having a first end portion and a second end portion opposite to the first end portion, the first end portion of the link cover pivotally connected to the frame along with the one end portion of the upper pivoting link, the second end portion of the link cover fixed to the other end portion of the upper pivoting link,
   wherein the pulling handle expands in a direction where the grip section moves away from the respective one end portions of the upper and lower pivoting links, by pivoting about the proximal end portion in interlocked relation to upward pivotal movement, about the respective one end portions, of the upper and lower pivoting links responsive to a pulling force applied to the pulling handle by the human operator, and
   the pulling handle collapses in a direction where the grip section moves toward the respective one end portions of the upper and lower pivoting links toward a collapsed position, by pivoting about the proximal end portion in interlocked relation to downward pivotal movement, about the respective one end portions, of the upper and lower pivoting links responsive to a pushing force applied to the pulling handle by the human operator.

2. The mobile power generator apparatus according to claim 1, wherein expanding and collapsing movement of the pulling handle is regulated by the upper and lower pivoting links in such a manner that the grip section moves in a predetermined trajectory during the expanding and collapsing movement.

3. The mobile power generator apparatus according to claim 1, wherein the upper and lower pivoting links have first and second engaging portions, respectively, and as the pulling handle is expanded so that the grip section is shifted away from the respective one end portions of the upper and lower pivoting links to a pulling position for the human operator to pull and move the mobile power generator apparatus with the grip section, the second engaging portion of the lower pivoting link abuts against the first engaging portion of the upper pivoting link to thereby prevent the pulling handle from being expanded beyond the pulling position.

4. The mobile power generator apparatus according to claim 1, which further comprises:
   a handle retaining mechanism including first and second engaging elements that engage with each other as the pulling handle is expanded, so that the pulling handle is prevented from collapsing, due to weights of the pulling handle and the upper and lower pivoting links, when the pulling handle is in an expanded position with the grip section located in a pulling position for the human operator to pull and move the mobile power generator apparatus with the grip section, wherein
   the first engaging element comprises a retaining recess formed in the link cover, and
   the second engaging element is a boss provided at the other end portion of the lower pivoting link.

5. The mobile power generator apparatus according to claim 3, wherein the second engaging portion of the lower pivoting link is a boss provided at the other end portion of the lower pivoting link, and the first engaging portion of the upper pivoting link is a region of the upper pivoting link located near the other end portion of the upper pivoting link.

6. The mobile power generator apparatus according to claim 3, further comprising:
   a handle retaining mechanism including first and second engaging elements that engage with each other as the pulling handle is expanded, so that the pulling handle is prevented from collapsing, due to weights of the pulling handle and the upper and lower pivoting links, when the pulling handle is in an expanded position with the grip section located in the pulling position for the human operator to pull and move the mobile power generator apparatus with the grip section, wherein
   the first engaging element comprises a retaining recess formed in the link cover, and
   the second engaging element is a boss provided at the other end portion of the lower pivoting link.

7. The mobile power generator apparatus according to claim 1, wherein the link cover has a handle holder for holding the pulling handle when the pulling handle is in a collapsed position where the grip section is located near the respective one end portions of the upper and lower pivoting links.

* * * * *